US012679685B2

(12) United States Patent
Kazama

(10) Patent No.: US 12,679,685 B2
(45) Date of Patent: Jul. 14, 2026

(54) SHEET STACKER AND IMAGE FORMING APPARATUS

(71) Applicant: Ikumi Kazama, Kanagawa (JP)

(72) Inventor: Ikumi Kazama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 23 days.

(21) Appl. No.: 18/895,396

(22) Filed: Sep. 25, 2024

(65) Prior Publication Data

US 2025/0108992 A1 Apr. 3, 2025

(30) Foreign Application Priority Data

Oct. 2, 2023 (JP) ................................ 2023-171516

(51) Int. Cl.
*B65H 29/04* (2006.01)
*B65H 43/00* (2006.01)
*G03G 15/00* (2006.01)

(52) U.S. Cl.
CPC ........... *B65H 29/041* (2013.01); *B65H 43/00* (2013.01); *G03G 15/50* (2013.01); *G03G 15/6552* (2013.01); *G03G 15/6573* (2013.01); *B65H 2403/92* (2013.01); *B65H 2404/70* (2013.01)

(58) Field of Classification Search
CPC .. B65H 29/041; B65H 43/00; B65H 2403/92; B65H 2404/70; G03G 15/50; G03G 15/6552; G03G 15/6573
See application file for complete search history.

(56) References Cited

U.S. PATENT DOCUMENTS

| | | | | |
|---|---|---|---|---|
| 2007/0284802 | A1* | 12/2007 | Ichimura | B65H 29/041 271/3.24 |
| 2017/0320694 | A1* | 11/2017 | Lewalski | B65H 29/041 |
| 2020/0130978 | A1* | 4/2020 | Tamura | B65H 29/125 |
| 2021/0325804 | A1* | 10/2021 | Furuhashi | G03G 15/6582 |
| 2021/0395033 | A1* | 12/2021 | Kazama | B65H 31/10 |
| 2022/0063949 | A1* | 3/2022 | Holtman | B65H 9/00 |
| 2022/0177255 | A1 | 6/2022 | Kazama | |
| 2023/0127575 | A1* | 4/2023 | Kazama | B65H 31/26 271/204 |
| 2023/0286769 | A1 | 9/2023 | Kazama | |

FOREIGN PATENT DOCUMENTS

| | | | |
|---|---|---|---|
| JP | 2010-168218 | A | 8/2010 |
| JP | 2015-151216 | A | 8/2015 |
| JP | 2021-147232 | A | 9/2021 |
| JP | 2023-065102 | A | 5/2023 |

* cited by examiner

*Primary Examiner* — David H Banh
(74) *Attorney, Agent, or Firm* — XSENSUS LLP

(57) ABSTRACT

A sheet stacker includes a load table to stack a bundle of sheets; a conveyor to convey a sheet to the load table in a conveyance direction at a conveyance speed; a guide including a holder to: hold a leading end of the sheet conveyed by the conveyor by the holder at a standby position; and move the holder to guide the sheet along a movement path in the conveyance direction at a moving speed while holding the sheet by the holder; and a leading-end alignment mechanism including a partition extending to the movement path of the holder, the leading-end alignment mechanism to align, in the conveyance direction, a leading-end position of the sheet on the load table; and circuitry configured to differentiate the conveyance speed of the conveyor and the moving speed of the holder.

20 Claims, 15 Drawing Sheets

SHEET STACKER AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2023-171516, filed on Oct. 2, 2023, in the Japan Patent Office, the entire disclosure of which is hereby incorporated by reference herein.

BACKGROUND

Technical Field

The present embodiment relates to a sheet stacker and an image forming apparatus including the sheet stacker.

Related Art

An electrophotographic image forming apparatus includes a sheet stacker that stacks conveyed sheets as a sheet bundle.

In such a sheet stacker, sheet conveyance is hindered due to a curl of a sheet bundle with which a load tray is stacked, causing the next ejected sheet to be jammed at the time of movement from a conveying member to the load tray.

As a countermeasure against such a disadvantage, provided is a sheet rear-end depressor that hits, toward the load tray, the rear portion of a falling sheet.

In the sheet stacker, a guide that conveys a sheet while holding the front end of the sheet being conveyed moves at a rate identical to a sheet conveyance speed with the conveying member sending off the rear end of the sheet to convey the sheet to a load position and then load the sheet at the load position.

In such a sheet stacker, with the difference in speed between the sheet conveyance speed of the conveying member and the sheet conveyance speed of the guide, the sheet gripped by the guide is detached from the guide, so that the detached sheet falls so as to be loaded on the tray.

According to such a technique, the guide accelerates just before arriving at the sheet load position to further increase the difference in speed to the conveyance speed of the sheet being conveyed by the conveying member. Thus, the front end of the sheet is reliably detached from the guide. The sheet having its front end detached from the guide falls freely so as to be loaded on the load tray.

In addition, provided is a leading-end alignment mechanism including a plate member that is movable in the width direction or in the conveyance direction and pushes an end portion of a sheet loaded on the load tray to align the position of the end portion of the sheet.

SUMMARY

In an aspect of the present disclosure, a sheet stacker includes a load table to stack a bundle of sheets; a conveyor to convey a sheet to the load table in a conveyance direction at a conveyance speed; a guide including a holder to: hold a leading end of the sheet conveyed by the conveyor by the holder at a standby position; and move the holder to guide the sheet along a movement path in the conveyance direction at a moving speed while holding the sheet by the holder; and a leading-end alignment mechanism including a partition extending to the movement path of the holder, the leading-end alignment mechanism to align, in the conveyance direction, a leading-end position of the sheet on the load table; and circuitry configured to differentiate the conveyance speed of the conveyor and the moving speed of the holder

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
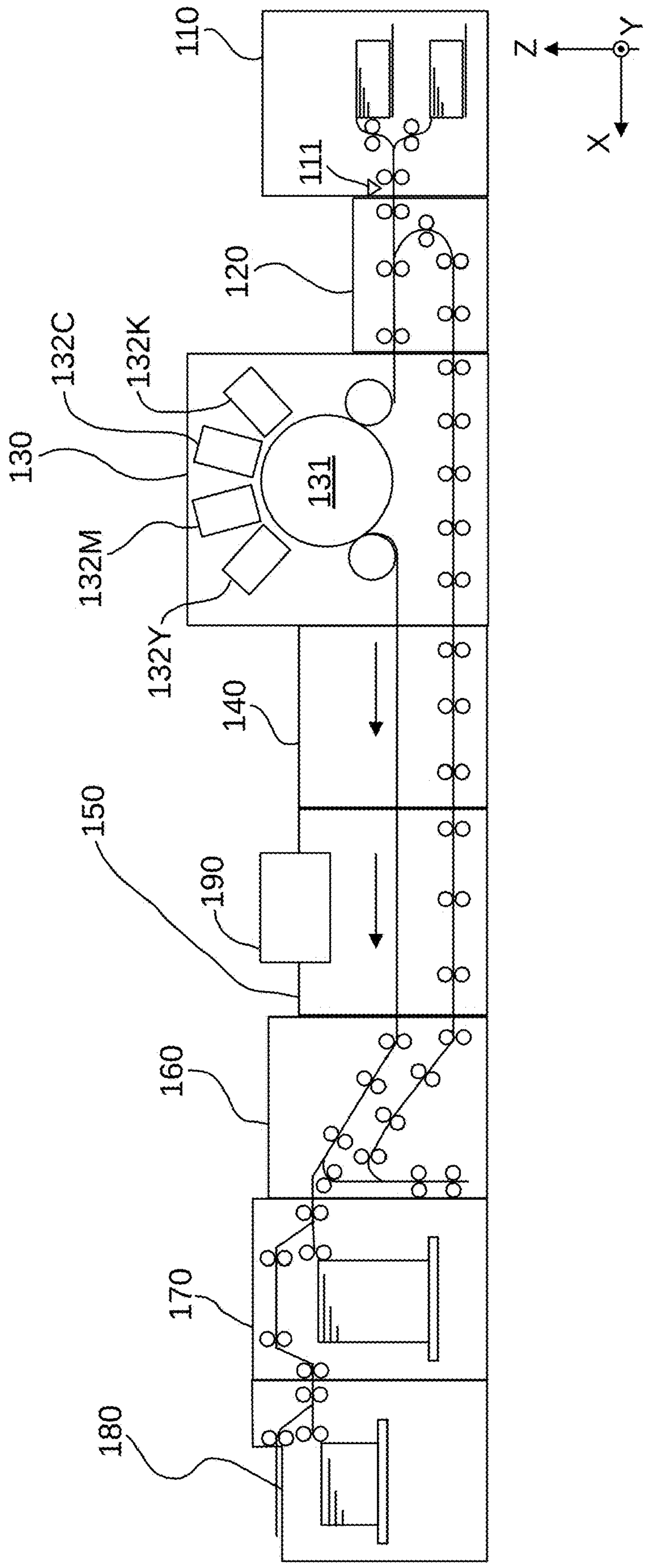
FIG. 1 is a schematic view of an image forming apparatus to which an embodiment of the present embodiment can be applied.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

FIG. 1 illustrates an image forming apparatus to which an embodiment of the present embodiment can be applied. An image forming apparatus 1 in FIG. 1 includes a sheet feeder 110 that stores sheets S as recording media, a sheet position adjuster 120 that adjusts the position of a sheet S, and an image former 130 that forms an image on a sheet S.

The image forming apparatus 1 further includes a sheet dryer 140 that dries an image formed on a sheet S, a sheet cooler 150, a sheet reverser 160 that turns a sheet S upside down, a first sheet stacker 170 and a second sheet stacker 180 that each stack sheets S as a sheet stacker according to the present embodiment, and an operation section 190 that controls each constituent on the basis of an instruction from an operator such as an operation panel.

The sheet feeder 110 and the sheet position adjuster 120 convey, sheet by sheet, the sheets S loaded and stored in advance. For example, the sheet feeder 110 is provided with a sheet-size detecting sensor 111 that detects the size of a sheet S to be fed. The sheet-size detecting sensor 111 includes a plurality of sheet-size detecting sensors such that the length and width of a sheet S can be detected.

In accordance with sheet-size information from the sheet-size detecting sensor 111, the sheet position adjuster 120 adjusts timing such that the image former 130 can form an image at a predetermined position on the sheet S.

In the present embodiment, the image former 130 serves as an inkjet recorder that discharges inks of four colors of black (K), cyan (C), magenta (M), and yellow (Y) to form a full-color image on a sheet S. The image former 130 includes a drum 131 as a main part and liquid dischargers 132K, 132C, 132M, and 132Y disposed around the drum 131. The liquid dischargers 132K, 132C, 132M, and 132Y correspond to the four colors and form, on a sheet S, color images corresponding C, M, Y, and K.

The sheet dryer 140 dries an inkjet image formed on a sheet S and then the sheet cooler 150 cools the sheet S to keep the inkjet image formed on the sheet S stable on the sheet S.

As necessary, the sheet reverser 160 turns a sheet S upside down in a switch back manner with rollers and conveys the sheet S back to the sheet position adjuster 120, so that a switch is made to the other face on which an image to be formed of the sheet S.

Note that the constituents are properly controlled in accordance with an operation on the operation section 190 by the operator such that an image is formed.

In the present embodiment, in particular, described has been an inkjet printer that forms an inkjet image. For example, an image forming apparatus may be provided including an electrophotographic image former as the image former 130. In that case, instead of the sheet dryer 140 and the sheet cooler 150, provided may be a fixer that fixes a toner image on a sheet S.

The constituents in the image forming apparatus 1 described above may be identical in configuration to the constituents in a conventional image forming apparatus, and descriptions thereof will be omitted as appropriate.

As the sheet stacker according to the present embodiment, the first sheet stacker 170 will be now described.

Note that the first sheet stacker 170 and the second sheet stacker 180 correspond to a plurality of ejection destinations for sheets S in the image forming apparatus 1 and may be identical or different in configuration. As an embodiment of the present embodiment, the first sheet stacker 170 and the second sheet stacker 180 have no difference in configuration, except that their sheet ejection destinations are different in shape. Thus, in particular, the first sheet stacker 170 will be described.

The first sheet stacker 170 includes a sheet tray 5 as a load table, a conveyor 6 that conveys a sheet S toward the sheet tray 5, a guide mechanism 7 that conveys the sheet S conveyed toward the sheet tray 5 downstream in the conveyance direction while gripping the front end of the sheet S, a sheet leading-end detecting sensor 8, and a conveyance detour 9 that allows the sheet S from the upstream side in the conveyance direction to be conveyed to the second sheet stacker 180 located downstream in the conveyance direction such that the sheet S detours around the sheet tray 5.

The sheet tray 5 provided to the bottom of the first sheet stacker 170 serves as a load table to be stacked with a plurality of sheets S subjected to image formation.

The sheet tray 5 has its initial position located below a sheet S conveyed by the conveyor 6. The sheet tray 5 moves downward every time the sheet tray 5 is stacked with a sheet S. Thus, the position of the uppermost face of a sheet bundle loaded is kept at a height such that a sheet S ejected from the conveyor 6 is easily stacked on the sheet bundle.

The operator pulls the sheet tray 5 out of the first sheet stacker 170 to take out the sheets S loaded on the sheet tray 5.

The conveyor 6, which conveys a sheet S from the image former 130 toward the sheet tray 5, includes a well-known roller pair including a drive roller 6*a* and a driven roller 6*b*. The conveyor 6 receives a sheet S ejected by a feed roller 171 disposed most upstream in the first sheet stacker 170 and then conveys the sheet S downstream in the sheet conveyance direction indicated by an arrow A.

The sheet leading-end detecting sensor 8 is disposed on the upstream side of the conveyor 6 in the sheet conveyance direction A and detects the front end of a sheet S being conveyed to output a detection signal.

The guide mechanism 7 disposed on the downstream side of the conveyor 6 in the sheet conveyance direction A can convey, in the sheet conveyance direction A at a rate higher than the sheet conveyance speed of the conveyor 6, a sheet S conveyed by the conveyor 6 while holding the leading end of the sheet S.

The guide mechanism 7 functions as a guide that holds the leading end of a sheet S and then separates from the leading end of the sheet S at a detachment position for the sheet S to guide the conveyed sheet S onto the sheet tray 5.

The guide mechanism 7 includes an endless conveyance belt 10 stretched around a drive roller 13 and a driven roller 12 so as to run, and a holder 11 that is attached to the conveyance belt 10 and moves along with running of the conveyance belt 10. The conveyance belt 10 is variable in running rate because a controller 50 described later controls the operation of a motor 14 that drives the drive roller 13. The motor 14 serves as a stepping motor variable in rate and thus the position of the holder 11 on the conveyance belt 10 can grasped on the basis of the number of steps of the motor 14.

Figure 3:
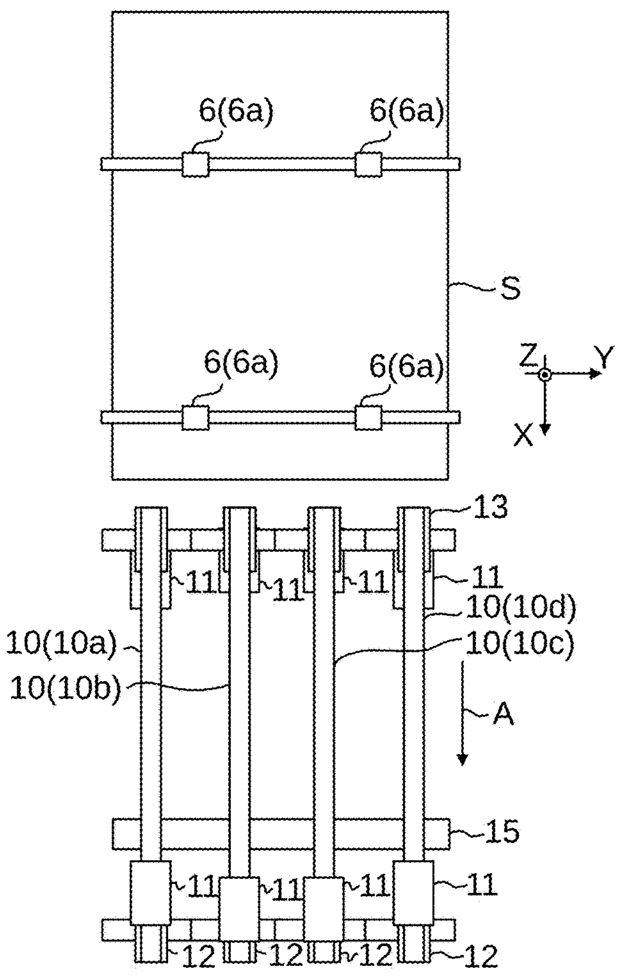
FIG. 3 is a schematic view of the sheet stacker viewed from above with holders at standby positions.

In the present embodiment, as illustrated in FIG. 3, four conveyance belts 10, namely, conveyance belts 10*a*, 10*b*,

10*c*, and 10*d* are disposed side by side in parallel in the width direction of a sheet S. The conveyance belts 10*a*, 10*b*, 10*c*, and 10*d* each have two holders 11 disposed in point symmetry.

Each holder 11 is attached to the outer circumference of the corresponding conveyance belt 10 wound around a drive roller 13 and a driven roller 12 and moves along with rotational running of the conveyance belt 10.

Figure 2:
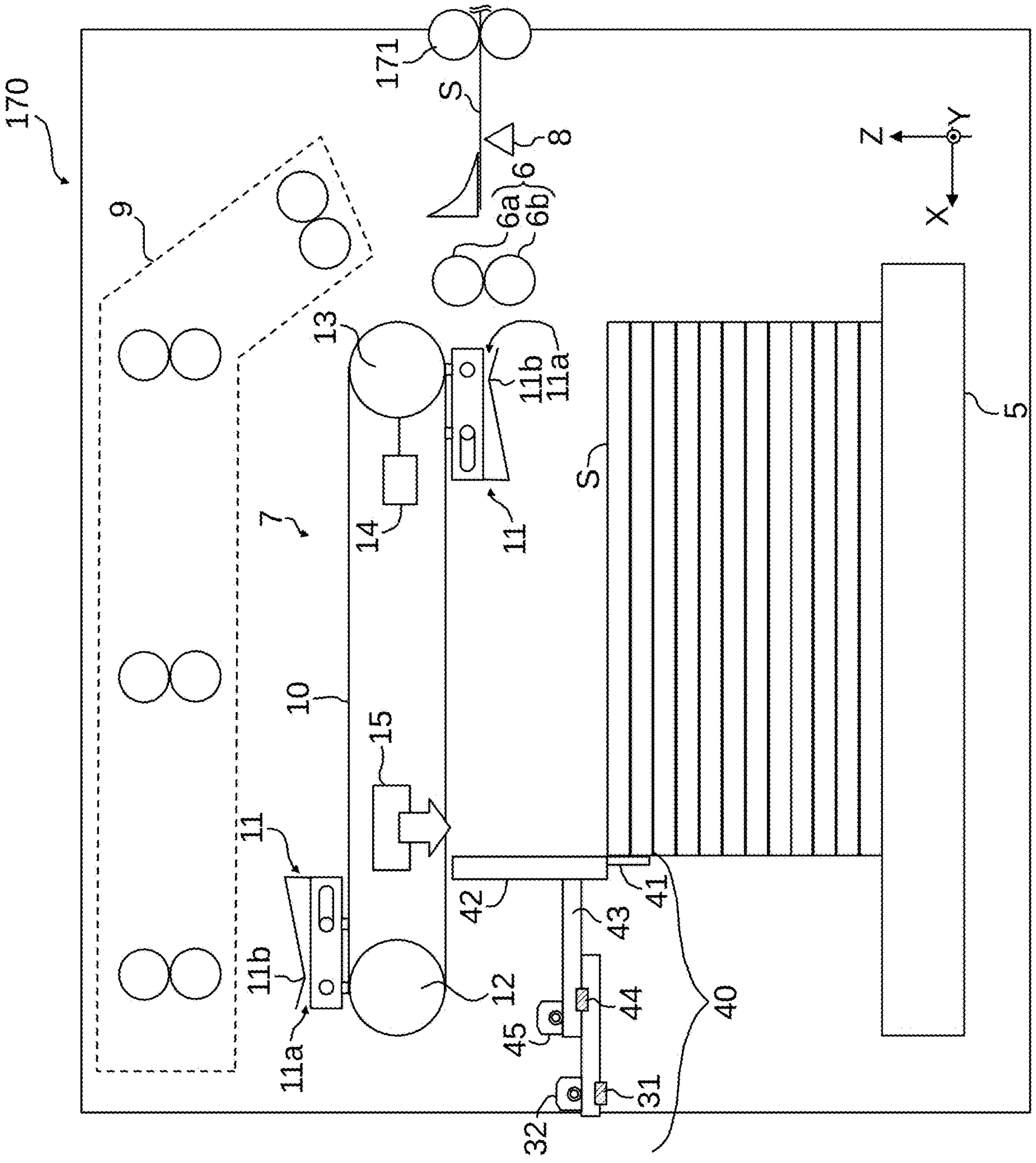
FIG. 2 illustrates an exemplary configuration of a sheet stacker according to the embodiment of the present embodiment.

That is, the "movement path of a holder 11 as a guide" is located outside the outer circumference of the corresponding conveyance belt 10. As illustrated in FIG. 2, when viewed along a Y axis, a partition 42 described later is located on the movement path of the holder 11.

In the first sheet stacker 170, with the difference in speed between the sheet conveyance speed of the conveyor 6 and the sheet conveyance speed of the guide mechanism 7, a sheet S held by holders 11 is detached from the holders 11, so that the detached sheet S is loaded on the sheet tray 5.

The guide mechanism 7 may have a portion, downstream in the sheet conveyance direction, provided with a blower fan 15 that gives a sheet S being conveyed a flow of air toward the upper face of the sheet tray 5, namely, downward. The blower fan 15 in continuous operation gives a flow of air to a sheet S being guided by holders 11 to push the sheet S to the sheet tray 5.

As illustrated in FIG. 2, each holder 11 includes an opening 11*a* through which the leading end of a sheet S is inserted and a gripper 11*b* that grips the leading end of the sheet S inserted through the opening 11*a*. The force of the gripper 11*b* to grip the leading end of a sheet S is set smaller than the frictional force between the conveyor 6 and the sheet S. Thus, in a case where the conveyor 6 conveys a sheet S to the holder 11 remaining stopped at a standby position illustrated in FIG. 2 to insert the sheet S into the opening 11*a*, the gripper 11*b* allows entry of the inserted sheet S because of the rigidity of the inserted sheet S and elastically holds the entered sheet S.

The holder 11 has a face to have contact with any sheet S and preferably the face is formed of a member high in smoothness, such as a metallic or resin member. Thus, the holder 11 can smoothly hold any sheet S.

At the time of reception of a sheet S, holders 11 each remain stopped at the standby position illustrated in FIG. 2. After the sheet leading-end detecting sensor 8 detects the front end of the sheet S and then the leading end of the sheet S is gripped by the grippers 11*b*, conveyance of the sheet S starts at a predetermined timing.

Thus, each holder 11 functions as a guide that holds, at the standby position, the leading end of a sheet S conveyed by the conveyor 6 and then moves in the sheet conveyance direction A to guide the conveyance of the sheet S.

In the first sheet stacker 170, as illustrated in FIGS. 2 and 3, two holders 11 are disposed on the outer circumference of each conveyance belt 10 and are mutually out of phase by 180 degrees as an aspect. Thus, even when one of the holders 11 completes the conveyance of a sheet S, the one goes half round due to running of the corresponding conveyance belt 10, so that in turn the other holder 11 returns to the standby position and then remains stopped at the standby position.

Thus, such two holders 11 move alternately to the standby position, so that a reduction is made in the time it takes for a holder 11 to return to its standby position, leading to an improvement in the cycle of conveyance of sheets S.

In the first sheet stacker 170, as illustrated in FIG. 3, four conveyance belts 10 are provided in a sheet width direction B orthogonal to the sheet conveyance direction A and are each provided with two holders 11. Thus, in comparison to a configuration in which a single conveyance belt 10 or two conveyance belts 10 are provided and two holders 11 are provided per conveyance belt 10, the holders 11 are smaller in size and the conveyance belts 10 have a lower inertial load during running. In addition, a sheet S can be retained in a stable pose because of an increase in the number of holders 11.

The conveyance belts 10*a*, 10*b*, 10*c*, and 10*d* as the four conveyance belts 10 are classified into side belts 10*a* and 10*d* located on both sides in the sheet width direction B and center belts 10*b* and 10*c* disposed between the side belts 10*a* and 10*d*.

The holders 11 on the side belts 10*a* and 10*d* are located differently in the sheet conveyance direction A from the holders 11 on the center belts 10*b* and 10*c*. Specifically, in the sheet conveyance direction A, the standby position for the holders 11 disposed on the center belts 10*b* and 10*c* is located upstream of the standby position for the holders 11 disposed on the side belts 10*a* and 10*d*.

The configuration described above causes a difference in the timing at which holders 11 hold a sheet S between the side belts 10*a* and 10*d* and the center belts 10*b* and 10*c*, leading to a reduction in load at the time of entry of a sheet S to holders 11. In addition, a difference is made in the timing at a sheet S is detached from holders 11, so that a sheet S can be retained in a stable pose.

As illustrated in FIG. 3, the conveyor 6 includes four roller pairs each including the drive roller 6*a* and the driven roller 6*b* described above, and each roller pair is disposed in a space corresponding to the space between the conveyance belts 10*a* and 10*b*, the space between the center belts 10*b* and 10*c* of the conveyance belts 10*a*, 10*b*, 10*c*, and 10*d*, or the space between the conveyance belts 10*c* and 10*d*. Note that, referring to FIG. 3, the drive rollers 6*a* connected to a drive source are disposed on the side of location of the upper face of a sheet S, but this configuration is not limiting.

At the end on the downstream side in the sheet conveyance direction A of the sheet tray 5, provided is a leading-end alignment mechanism 40 that abuts on the leading end of a conveyed sheet S to align the front end of the sheet S.

The leading-end alignment mechanism 40 includes an alignment guide plate 41, a partition 42 extending from the upper portion of the alignment guide plate 41 and being flush with the alignment guide plate 41, and a base 43, in which the alignment guide plate 41 is reciprocally moved along the sheet conveyance direction A and abuts on the leading end of a sheet S to align its front end position, and the base 43 supports the alignment guide plate 41 and the partition 42 to reciprocate along the sheet conveyance direction A.

The leading-end alignment mechanism 40 further includes a leading-end alignment motor 45 and a leading-end alignment-mechanism position detecting sensor 44, in which the leading-end alignment motor 45 is attached to the base 43 to reciprocate the base 43 along the A direction.

The leading-end alignment mechanism 40 includes a shift mechanism 30, a shift-mechanism position detecting sensor 31, and a shift motor 32, in which the shift mechanism 30 supports the base 43 and changes the criterial position of the base 43 on the basis of information on the size of a sheet S from the sheet-size detecting sensor 111, and the shift motor 32 reciprocates the shift mechanism 30 in +A directions to adjust the position of the shift mechanism 30.

In the leading-end alignment mechanism 40, the initial position of the alignment guide plate 41 is determined depending on the size of a sheet S. A sheet S conveyed by holders 11 abuts on the alignment guide plate 41 disposed at the initial position and then moves downward to the sheet tray 5 so as to be loaded for a sheet bundle.

Note that, for such positioning with the leading-end alignment mechanism 40, in the present embodiment, mainly, the shift motor 32 positions the shift mechanism 30.

Figure 4:
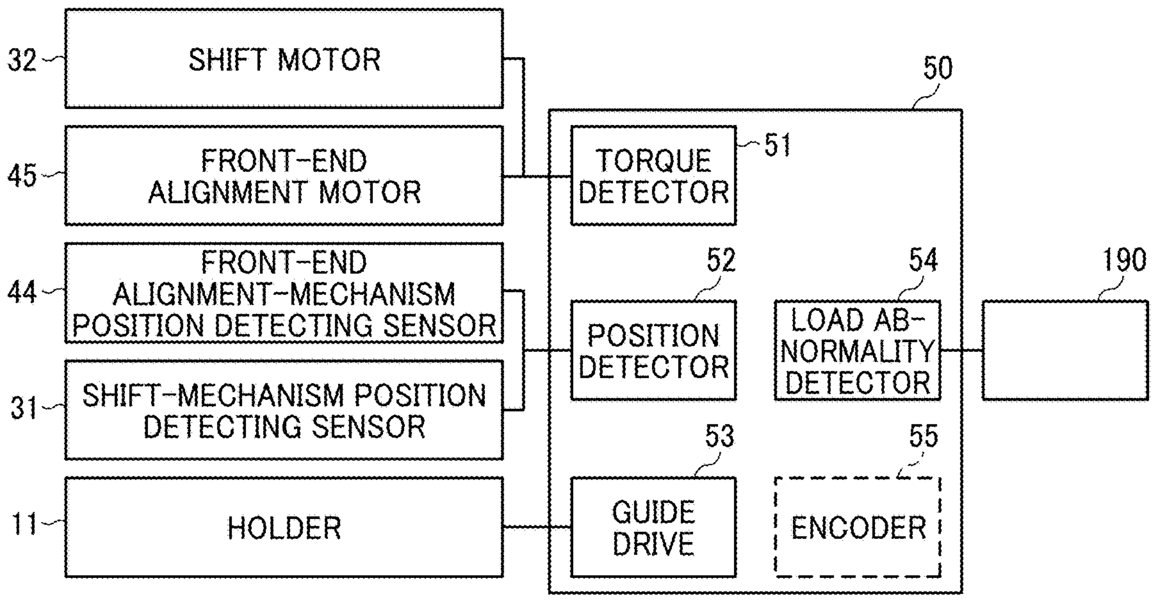
FIG. 4 is a block diagram of a controller for the sheet stacker.

FIG. 4 is a control block diagram of a controller 50 that controls the operation of the first sheet stacker 170. The controller 50, which is achieved by a well-known micro-computer including a central processing unit (CPU), a read-only memory (ROM), and a random-access memory (RAM), receives input signals or input information from the sheet-size detecting sensor 111, the sheet leading-end detecting sensor 8, and other sensors to control the operations of various types of actuators in the first sheet stacker 170, such as the motor 14 and the blower fan 15.

The controller 50 includes a torque detector 51 that detects the respective torques of the leading-end alignment motor 45 and the shift motor 32 that are each a stepping motor that operates the leading-end alignment mechanism 40 described later, a position detector 52 that detects the position of the leading-end alignment mechanism 40, and a guide drive 53 that controls the operation of the holders 11.

In order to notify, in response to detection of abnormality by any of such constituents, the operation section 190, which is a superior device, of the abnormality, the controller 50 includes a load abnormality detector 54 that transmits error information to display the abnormality on the operation section 190 such as the operation panel.

The controller 50 may further include an encoder 55 as a step-out detector having a step-out detector to detect step-out of the leading-end alignment motor 45 or the shift motor 32 as described later, Note that, for example, such controllers 50 may be provided one-to-one to the first sheet stacker 170 and the second sheet stacker 180. In that case, the already-described functions also apply to the second sheet stacker 180, and thus repetitive description will be omitted.

The torque detector 51 monitors the torque values of the leading-end alignment motor 45 and the shift motor 32.

On the basis of respective signals from the leading-end alignment-mechanism position detecting sensor 44 and the shift-mechanism position detecting sensor 31, the position detector 52 calculates the position of the partition 42 to control the position of the leading-end alignment mechanism 40, properly.

The guide drive 53 rotates the holders 11 or stops the rotation of the holders 11 to control the operation of the guide mechanism 7.

In a case where abnormality occurs in the operation of any of the torque detector 51, the position detector 52, and the guide drive 53, the load abnormality detector 54 notifies the operation section 190, which is a superior device, of an error as a sheet load abnormality in the first sheet stacker 170.

Next, a sheet conveyance process by the first sheet stacker 170 described above will be described.

Note that the first sheet stacker 170 and the second sheet stacker 180 can each load sheets S with a similar configuration in a similar control manner, and thus the first sheet stacker 170 will be described in the present embodiment.

First, the first sheet stacker 170 acquires length information on a sheet S to be conveyed and loaded. Specifically, used is size information based on the length and width of the sheet S detected by the sheet-size detecting sensor 111 or size information on a sheet S input by the operator through the operation section 190 in the image forming apparatus 1.

In the first sheet stacker 170, on the basis of the length information on the sheet S, the leading-end alignment mechanism 40 moves in advance to the initial position to regulate the length in the sheet conveyance direction A of the sheet tray 5.

Next, in response to conveyance of a sheet S, on which an image is formed due to the driving of the sheet feeder 110, the sheet position adjuster 120, and the image former 130, to the first sheet stacker 170, the feed roller 171 starts to convey the sheet S conveyed after image formation by the image former 130, followed by driving of the conveyor 6. In this case, the guide mechanism 7 remains in a standby state illustrated in FIG. 2 with holders 11 kept stopped at the respective standby positions, and the blower fan 15 starts to operate at a continuously constant air volume.

After that, made is a determination as to whether or not the sheet leading-end detecting sensor 8 has detected the front end of the sheet S. In a case where the determination indicates that the sheet leading-end detecting sensor 8 has detected the front end of the sheet S, a first predetermined time is measured as elapsed time based on the time of detection of the front end of the sheet S. The first predetermined time is determined in advance corresponding to the size of the sheet S to be conveyed. In response to elapse of the first predetermined time, the conveyance belts 10 start to run, that is, the holders 11 remaining stopped at the standby positions start to move in the sheet conveyance direction A. In this case, the conveyance speed of the sheet S of the conveyor 6 is higher than the moving speed of the holders 11, and thus the leading end of the sheet S enters the holders 11 through the respective openings 11*a*, so that the entered leading end of the sheet S is gripped by the grippers 11*b* such that the sheet S is held.

Figure 5:
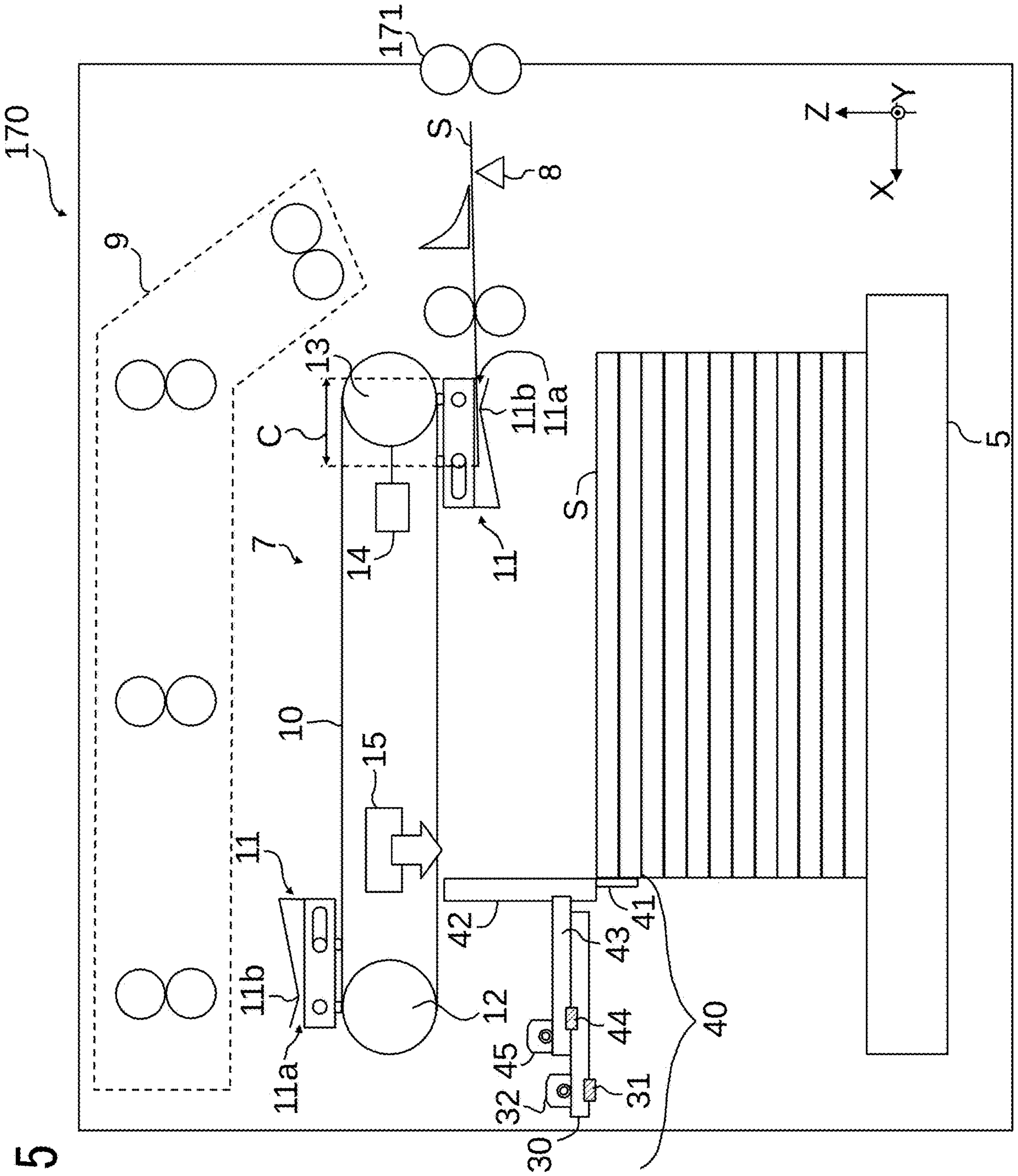
FIG. 5 illustrates an example of the sheet stacker with a sheet having its leading end having entered the holders.

The controller 50 controls the moving speed of the holders 11, namely, the driving rate of the motor 14, which drives the conveyance belts 10 to run, such that the conveyance speed of the sheet S of the conveyor 6 and the moving speed of the holders 11 are equal at the time of completion of entry of the sheet S to the holders 11. Thus, due to the difference in speed before equality between the moving speed of the holders 11 and the conveyance speed of the sheet S of the conveyor 6, the leading end of the sheet S enters the holders 11. The time from the start of movement of the holders 11 to completion of entry of the sheet S to the holders 11 is determined as a second predetermined time. In this case, the entry amount of the leading end of the sheet S to the holders 11 based on the first and second predetermined times corresponds to a predetermined amount C illustrated in FIG. 5.

When the holders 11 hold the sheet S, that is, when the entry amount of the leading end of the sheet S to the holders 11 fulfills the predetermined amount C, first acceleration is applied to the moving speed of the holders 11, followed by measurement of a third predetermined time based on the previously acquired size information on the sheet S. The conveyor 6 and the guide mechanism 7 start conveyance and movement of the sheet S with the difference in speed between the conveyance speed of the sheet S of the conveyor 6 and the moving speed of the holders 11 due to the first acceleration. In this case, the moving speed of the holders 11 is higher than the conveyance speed of the sheet S of the conveyor 6, and thus the holders 11 convey the sheet S while pulling the leading end of the sheet S, so that the sheet S can be prevented from bending in comparison to a case where the moving speed of the holders 11 is equal to the conveyance speed of the sheet S of the conveyor 6. During the conveyance, the force of the holders 11 holding the sheet S is smaller than the frictional force between the conveyor 6 and the sheet S, and thus the sheet S gradually comes out of the holders 11. However, the holders 11 keep the sheet S held from the position at the sheet S is held to the position at which the sheet S is detached.

Figure 6:
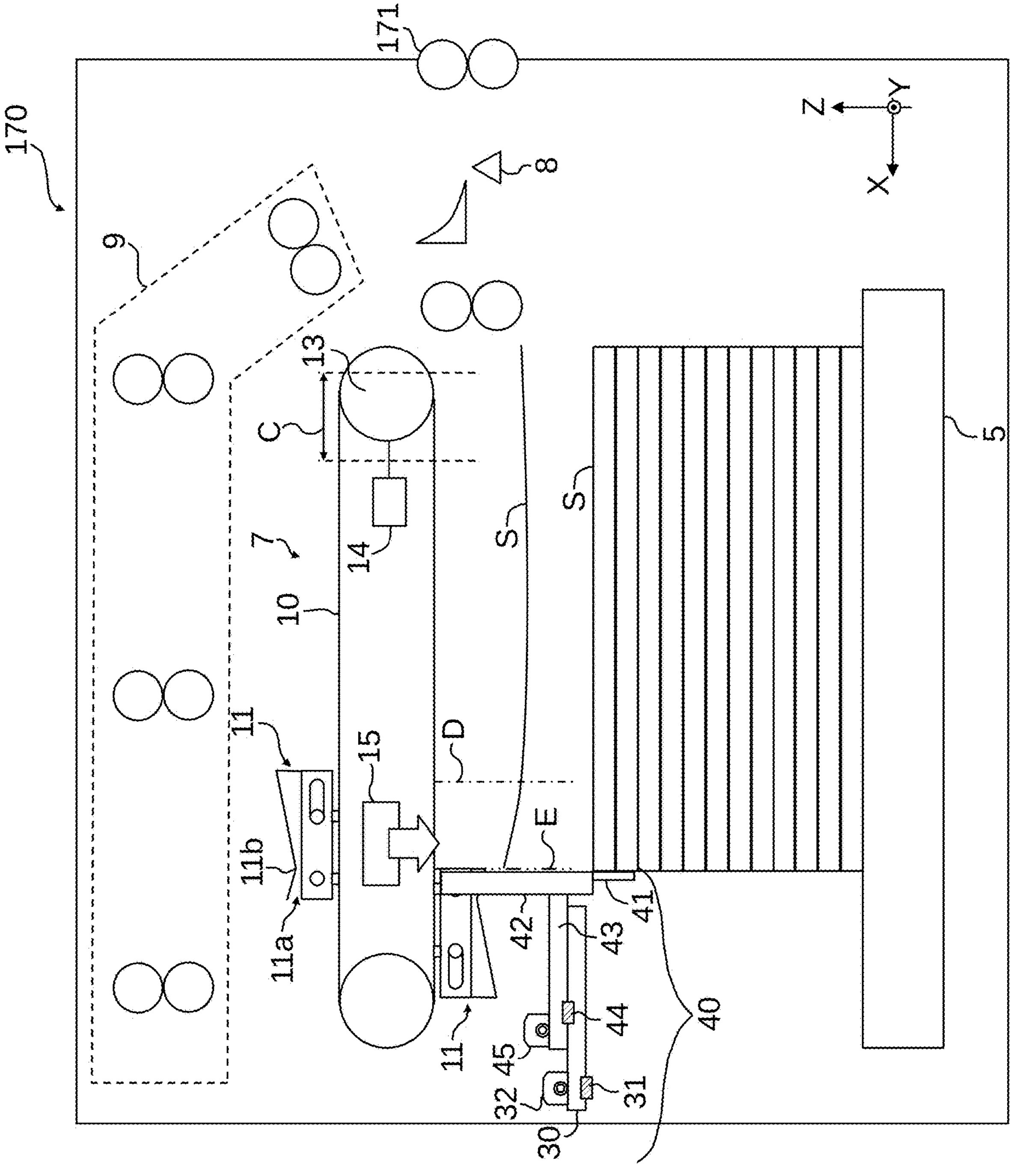
FIG. 6 illustrates a state where a sheet is detached from the holders.

In response to elapse of the third predetermined time from the time when the holders 11 hold the sheet S, second acceleration is applied to the moving speed of the holders 11. Thus, due to the moving speed of the holders 11 further accelerated, the sheet S is detached from the holders 11. Note that, even in a case where the sheet S comes out of the conveyor 6 before detachment of the sheet S from the holders 11, the sheet S is detached from the holders 11 due to the inertial force of the sheet S. FIG. 6 illustrates a state where the sheet S is detached from the holders 11.

Figure 7:
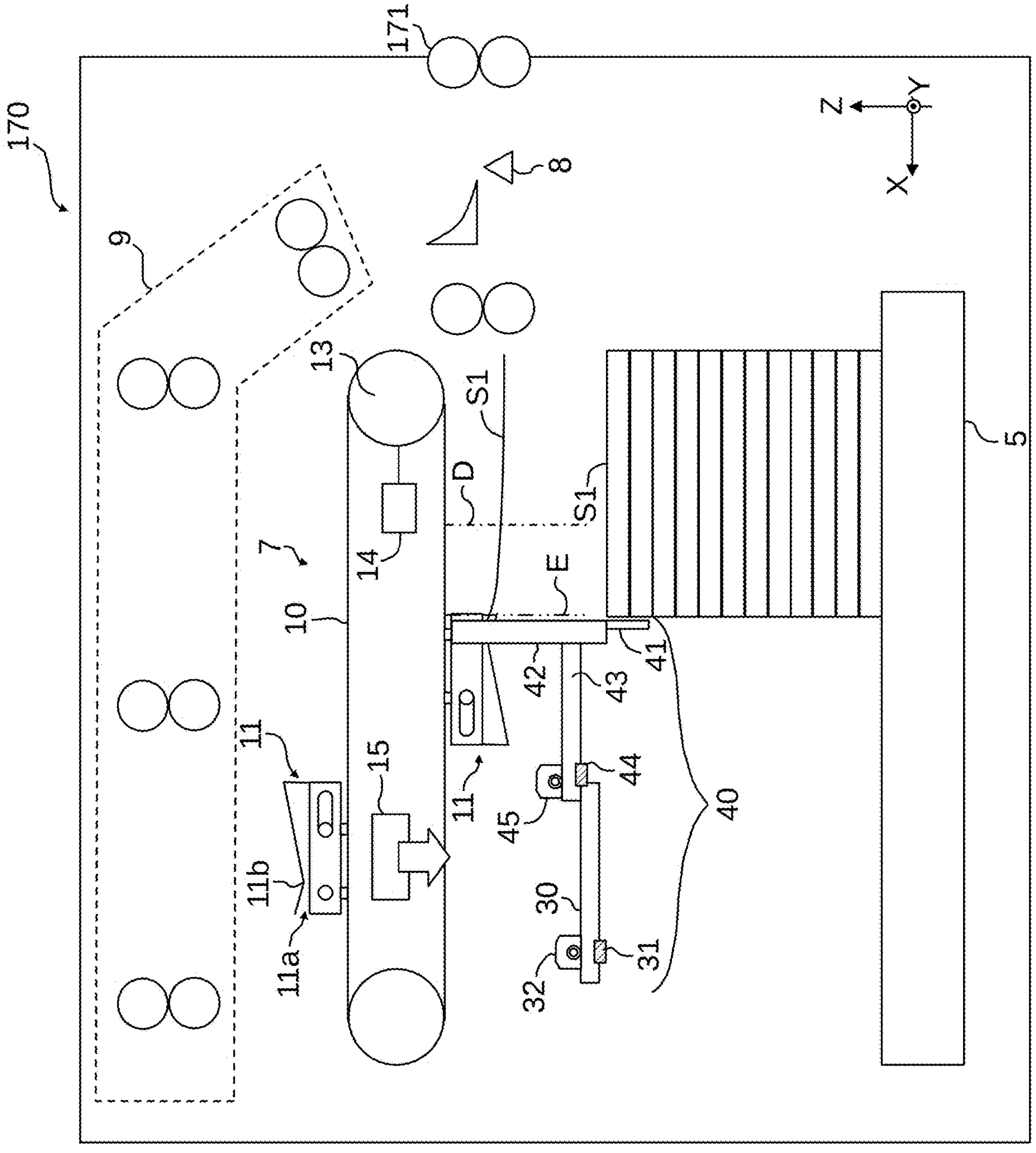
FIG. 7 illustrates a state where a small-sized sheet is detached from the holders.

Referring to FIG. 6, an acceleration position D is a position at which the second acceleration is applied to the holders 11, and a detachment position E is a position at which the sheet S is detached from the holders 11. FIG. 7 illustrates a case where a small-sized sheet S1 smaller in size than the sheet S is used, instead of the sheet S. As illustrated in FIG. 7, for use of the small-sized sheet S1, the controller 50 adjusts the acceleration position D and the detachment position E for the small-sized sheet S1 and further operates the shift mechanism 30 to move, in the −A direction, the position of the base 43 of the leading-end alignment mechanism 40 such that the positions of the alignment guide plate 41 and the partition 42 are changed to a position suitable to the small-sized sheet S1.

Thus, due to the difference in speed between the conveyance speed of the sheet S of the conveyor 6 and the moving speed of the holders 11 due to the second acceleration, the sheet S is detached from the holders 11.

The sheet S detached from the holders 11 after coming out of the conveyor 6 falls to the sheet tray 5 while receiving the force of wind from the blower fan 15, so that the sheet S is loaded on the sheet tray 5.

At the time of loading of the sheet S onto the sheet tray 5, the leading-end alignment mechanism 40 is located on the downstream side in the sheet conveyance direction A of the sheet S, and thus at least the sheet S is inhibited from moving downstream of the surface of the partition 42 of the leading-end alignment mechanism 40.

In response to detachment of the sheet S from the holders 11, a fourth predetermined time based on the previously acquired size information on the sheet S is measured. In response to elapse of the fourth predetermined time, the holders 11 start to decelerate such that the holders 11 stop at the standby positions.

After that, made is a determination as to whether or not the operation of image formation of the image former 130 has been completed. In a case where the determination indicates that the operation of image formation of the image former 130 has not been completed yet, made is a determination as to whether or not the sheet leading-end detecting sensor 8 has detected the front end of another sheet S. That is, the above-described operation is repeated until the operation of image formation is completed. In a case where the determination indicates that the operation of image formation of the image former 130 has been completed, the operations of the conveyor 6 and the blower fan 15 stop.

After completion of the operation of image formation of the image former 130, with a predetermined number of sheets S as a sheet bundle placed on the sheet tray 5, the first sheet stacker 170 causes the leading-end alignment mechanism 40 to operate to align respective end portions of the sheets S. Note that, assuming a typical case, the leading-end alignment mechanism 40 performs leading-end alignment after completion of the operation of image formation. However, the leading-end alignment mechanism 40 may perform leading-end alignment with any number of sheets S placed on the sheet tray 5.

Figure 8:
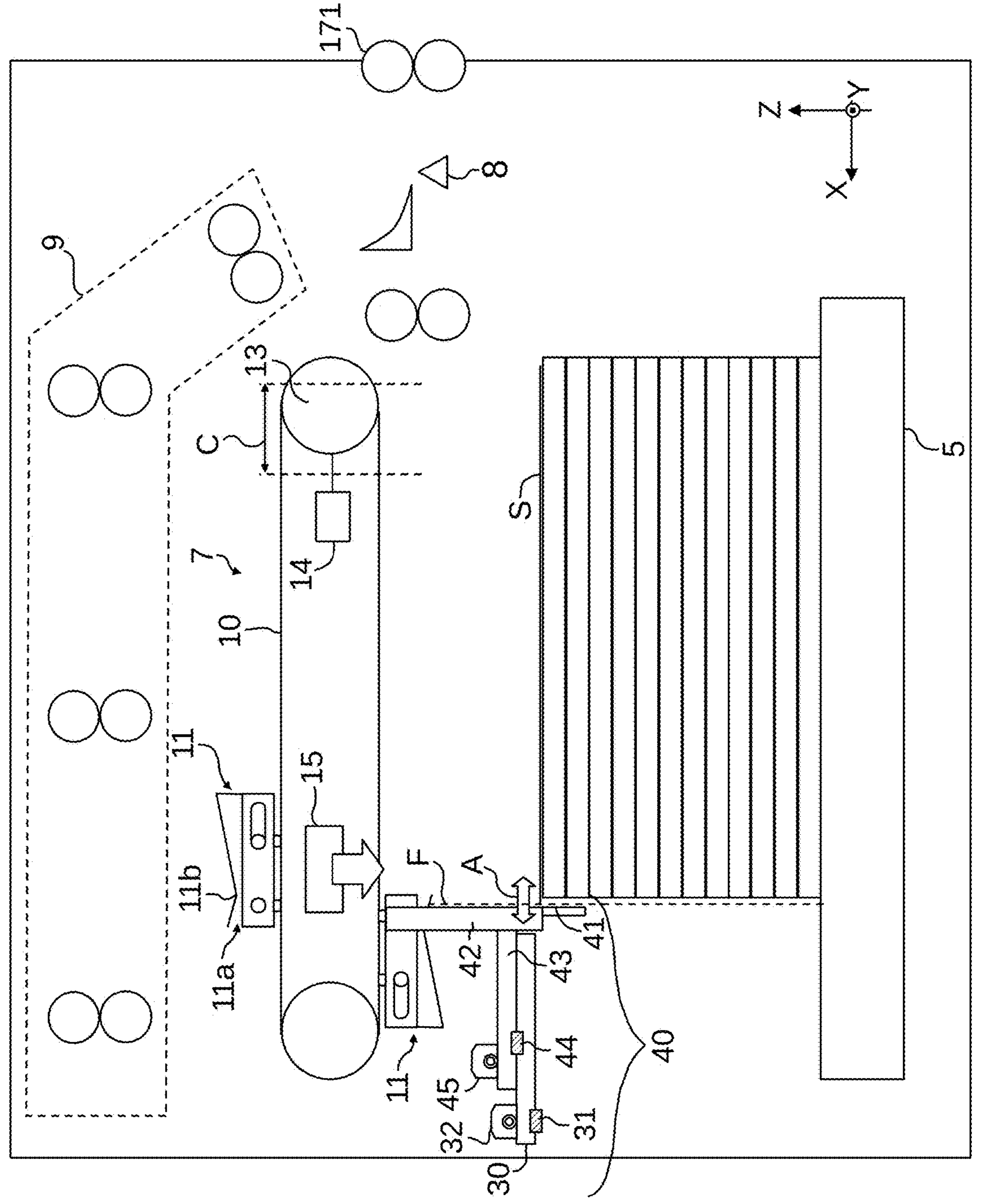
FIG. 8 is a schematic view illustrating an exemplary leading-end alignment operation of the sheet stacker.

For such an operation of leading-end alignment of the leading-end alignment mechanism 40, specifically, after placement of sheets S on the sheet tray 5, the leading-end alignment motor 45 operates to reciprocate the base 43, the alignment guide plate 41, and the partition 42 in the ±A directions as illustrated in FIG. 8.

Due to such an operation, any protrusive end in the A direction of the loaded sheets S abuts on the alignment guide plate 41 and is then pushed so as to be brought in the same plane as the other ends.

A drive source for such pushing is the leading-end alignment motor 45.

Note that, typically, simultaneously with such an operation of leading-end alignment, a side alignment mechanism 60 performs an operation of lateral alignment in the sheet width direction B.

Figure 9:
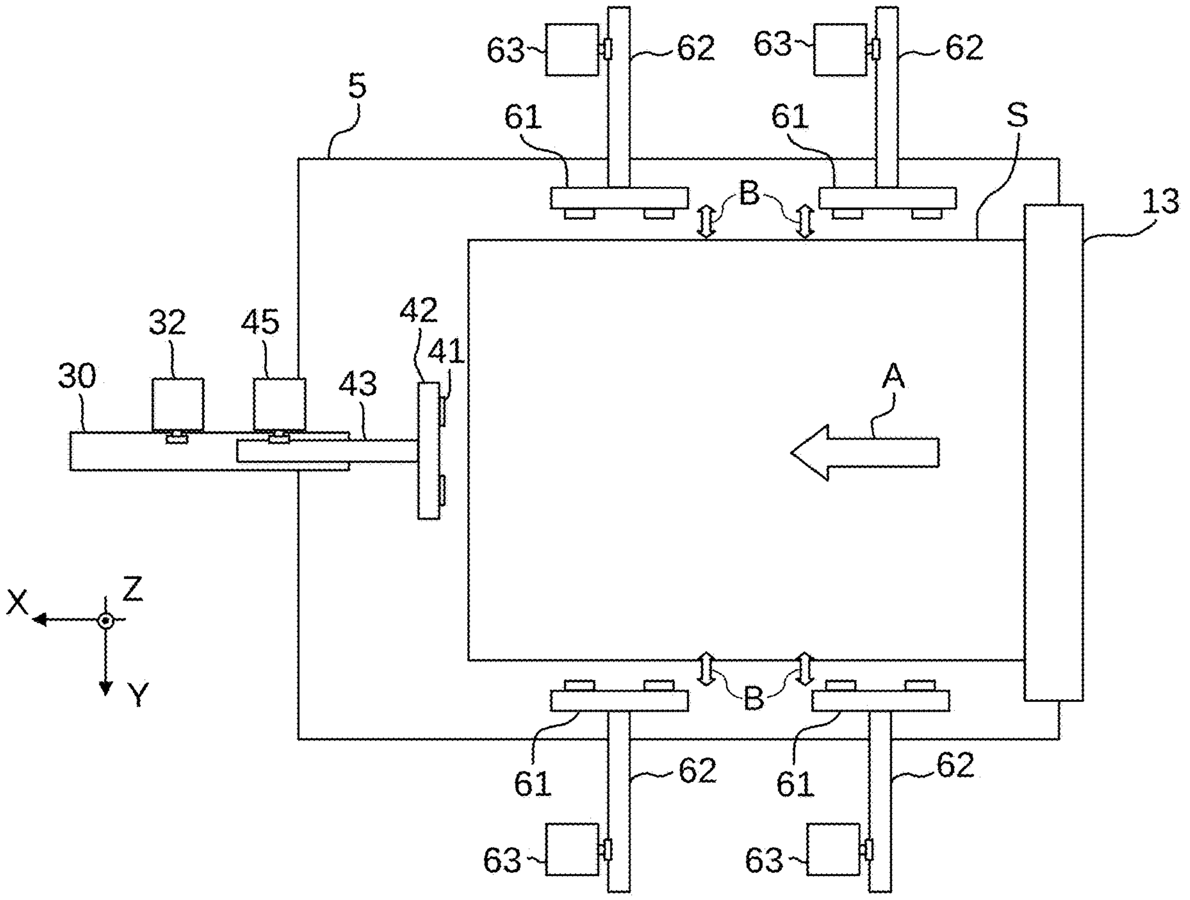
FIG. 9 is a schematic view illustrating an exemplary alignment operation in the width direction of the sheet stacker.

As illustrated in FIG. 9, in total, provided are four side alignment mechanisms 60 including two left side alignment mechanisms 60 and two right side alignment mechanisms 60 between which both sides of the sheets S placed on the sheet tray 5 are interposed.

The side alignment mechanisms 60 each include a side alignment plate 61 provided in parallel to an end face of the sheets S, a shaft 62 that is rod-shaped and supports the side alignment plate 61, and a side alignment motor 63 that operates the shaft 62 to reciprocate in the B direction in FIG. 9.

The controller 50 controls the side alignment motors 63 to operate the mutually facing side alignment plates 61 to sandwich the sheets S placed on the sheet tray 5, so that an operation of lateral alignment is performed to align the positions in the width direction of the sheets S.

Figure 10:
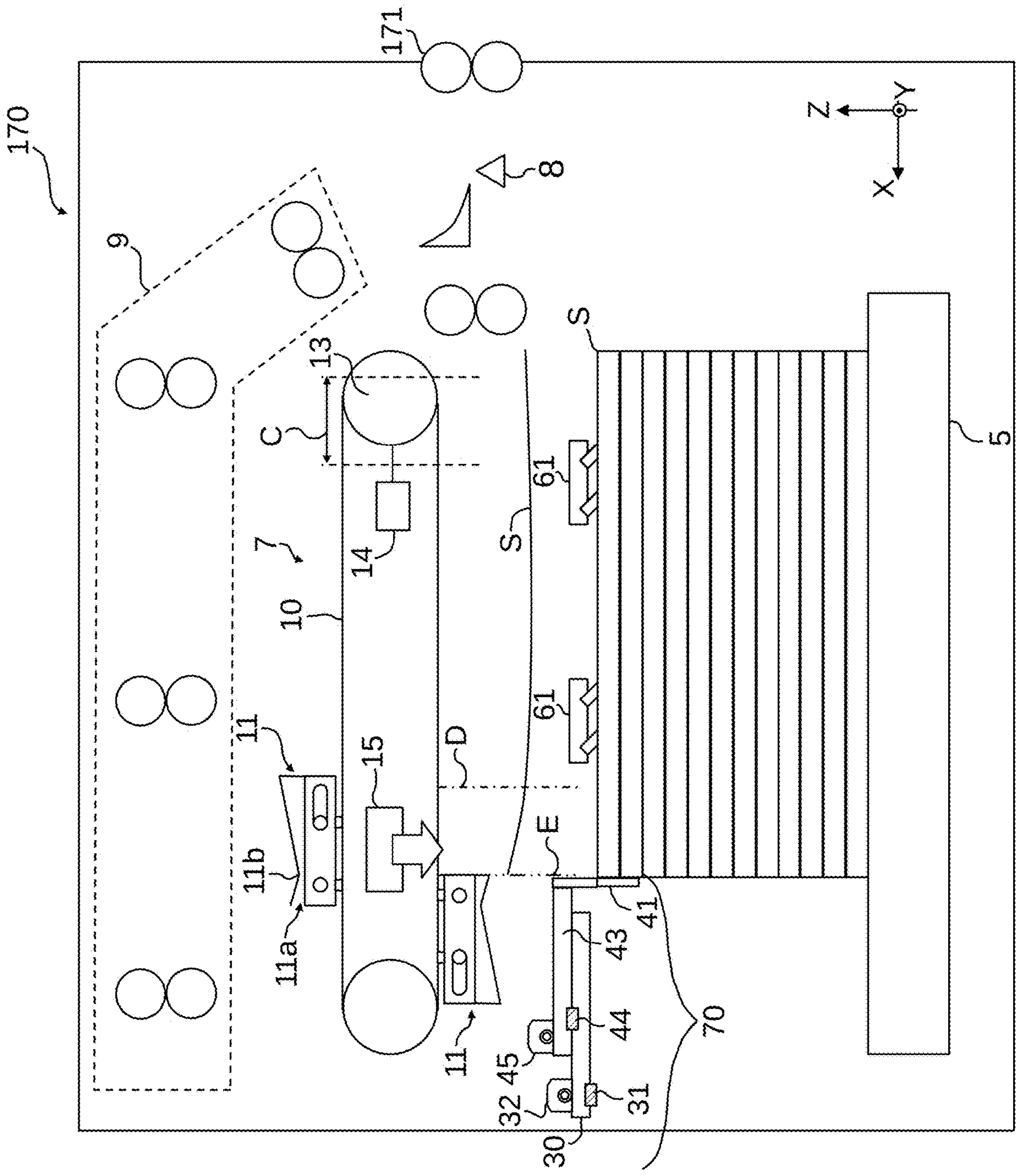
FIG. 10 illustrates a conventional sheet stacker as a comparative example.

As a comparative example of the present embodiment, a configuration in which a leading-end alignment mechanism 70 is provided, similarly to the present embodiment, will be described with FIG. 10.

The leading-end alignment mechanism 70 is basically similar in configuration to the already described leading-end alignment mechanism 40, except that no partition 42 protruding upward from a base 43 is provided.

A sheet S kept held by holders 11 is detached from the holders 11 to fall freely on a sheet tray 5, in response to arrival of the holders 11 at a detachment position E after the holders 11 move from respective standby positions and then accelerate at an acceleration position D. Note that, in this case, a blower fan 15 may cause a flow of air to push the sheet S downward, but whether or not to push the sheet S downward with such a configuration does not have much influence and thus description thereof will be omitted.

Figure 11:
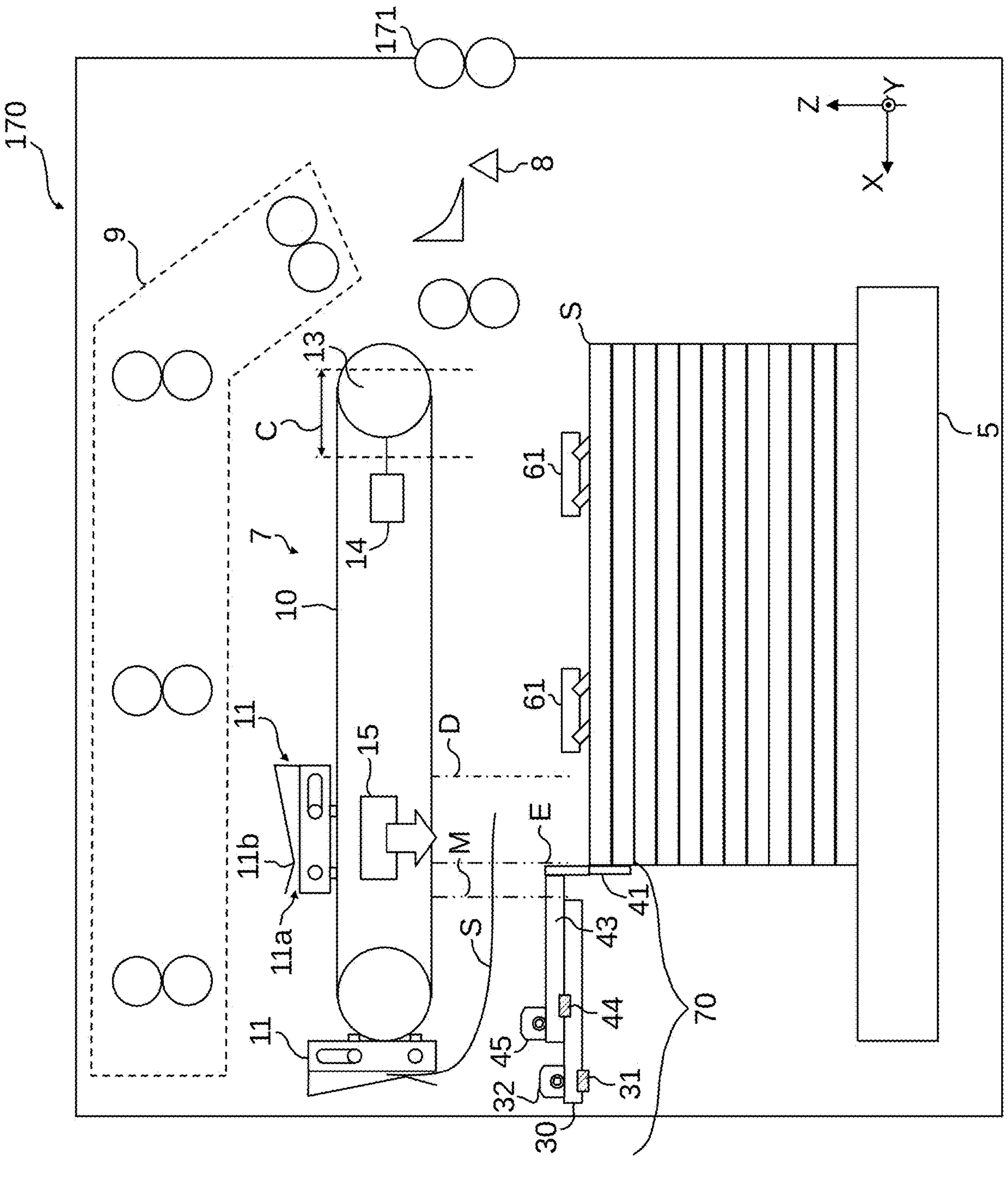
FIG. 11 illustrates an exemplary disadvantage in the comparative example illustrated in FIG. 10.

For example, in a case where the sheet S fails to be detached from the holders 11 at the detachment position E for some reason, for example, because the grippers 11*b* of the holders 11 grip the sheet S more tightly than expected, as illustrated in FIG. 11, the sheet S moves together with the holders 11 due to conveyance belts 10 to be drawn downstream in a sheet conveyance direction A over driven rollers 12.

Such a case where the sheet S is drawn downstream in the sheet conveyance direction A is referred to as sheet inflow, and the front end of a sheet load position in a case where the allowable sheet length is maximum in a first sheet stacker 170 is defined as a sheet load limit position M.

As illustrated in FIG. 11, in a case where the sheet S moves downstream of the sheet load limit position M, a jam is highly likely to occur because the sheet S moves to an unexpected position. Since the position to which the sheet S has moved is unexpected in ordinary usage, the sheet S is highly difficult to manually remove in order to release the jam.

Thus, in the embodiment of the present embodiment, in order to prevent the sheet S from moving downstream of the sheet load position, the leading-end alignment mechanism 40 is provided with the partition 42 to prevent the sheet S from passing downstream of the leading-end alignment mechanism 40.

Such a configuration will be described in more detail.

Figure 12:
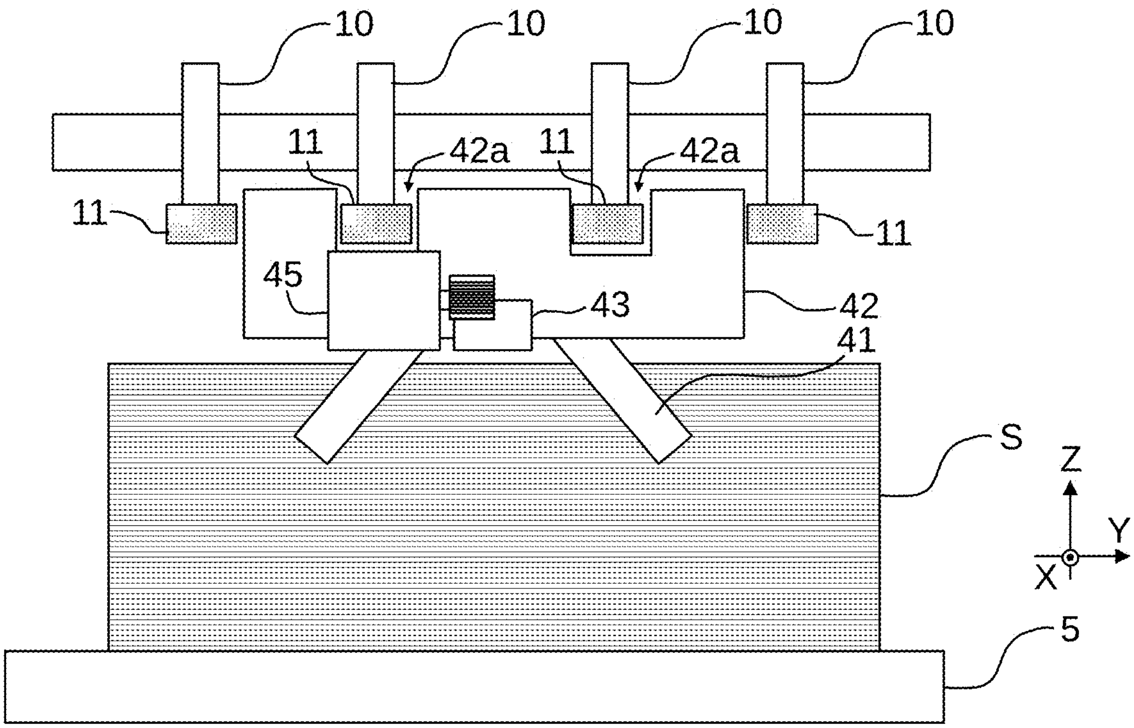
FIG. 12 illustrates an exemplary configuration of the sheet stacker viewed on the downstream side in the conveyance direction of the sheet stacker according to the embodiment of the present embodiment.

In the present embodiment, when viewed from the downstream side in the conveyance direction, as illustrated in FIG. 12, a plurality of conveyance belts 10 and a plurality of holders 11 are provided in the width direction.

When viewed from the downstream side in the conveyance direction, as an aspect, provided is the partition 42 having recesses through which conveyance belts 10 among the conveyance belts 10 and holders 11 among the holders 11 pass. In other words, the leading-end alignment mechanism 40 includes the partition 42 extending onto the movement paths of the holders 11 and recessed opening 42*a* provided to the partition 42. The leading-end alignment mechanism 40 is disposed so as to block an extension line of the conveyance path of a sheet S without blocking movement of the holders 11. The description "an extension line of the conveyance path of a sheet S" herein does not mean the (ordinary) conveyance path of the sheet S because the sheet S is ideally detached from the holders 11 at the detachment position E and the sheet S does not hit against the partition 42 in ideal action.

As already described, the partition 42 is provided to the leading-end alignment mechanism 40 that abuts on the front end in the conveyance direction of the sheet S to align its leading end position, and thus the partition 42 is located on the downstream side in the conveyance direction of the front end position F of a sheet bundle loaded on the sheet tray 5. The position of the partition 42 may vary forward or backward depending on the level of wind or conveyance but the partition 42 may be regarded as close to the detachment position E illustrated in FIG. 6.

Figure 13:
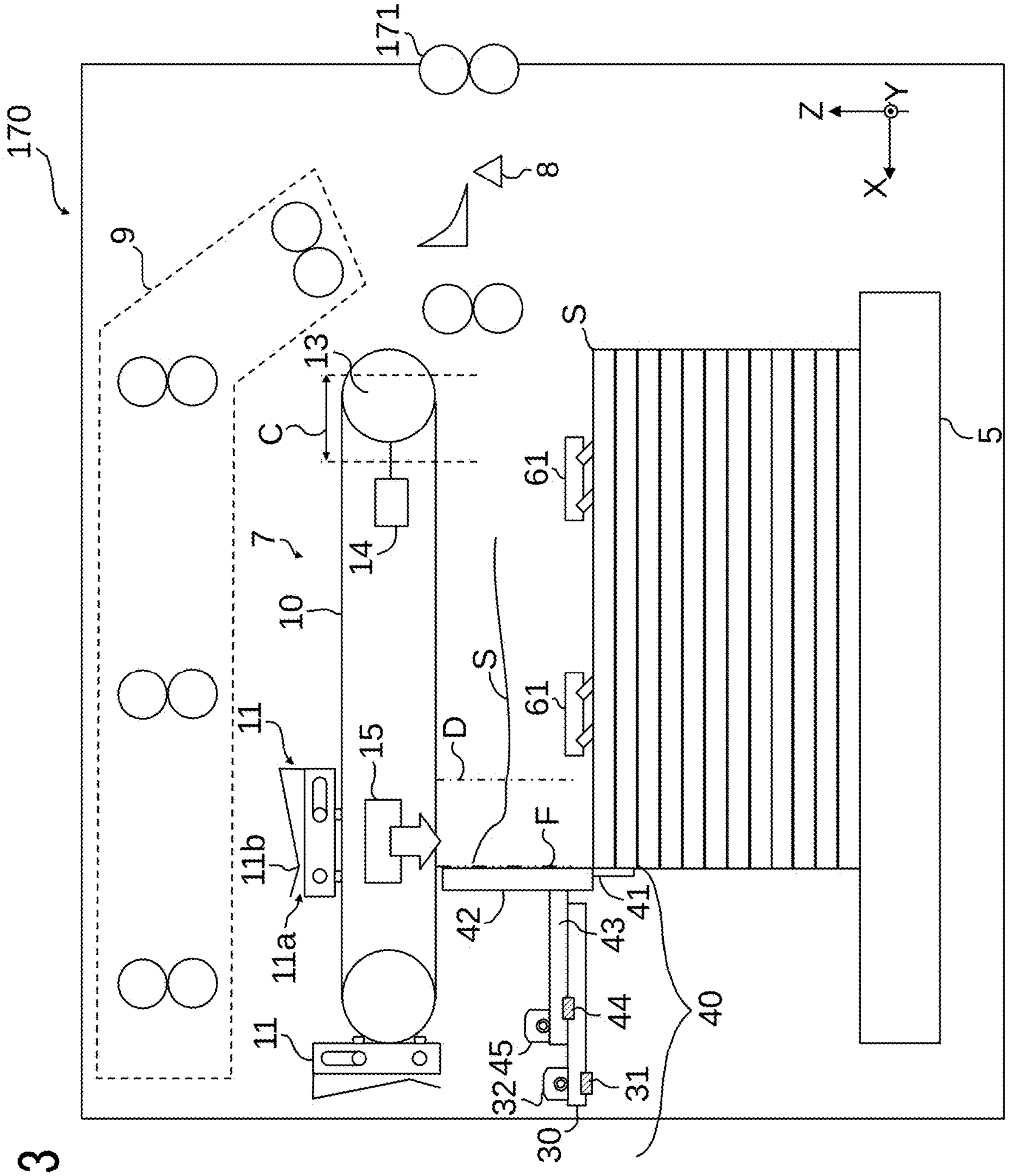
FIG. 13 illustrates the operation of a partition illustrated in FIG. 12.

According to such a configuration, as illustrated in FIG. 13, even if the holders 11 have a force strong enough to grip the sheet S and the leading end of the sheet S fails to be separated from the grippers 11*b* even after passage through the detachment position E, a side on the downstream side in the conveyance direction of the sheet S abuts on the partition 42, so that the sheet S is prevented from moving downstream of the sheet load position.

Meanwhile, the corresponding holders 11 pass through the recessed openings 42*a* of the partition 42, so that the conveyance belts 10 can move without stopping.

According to the recessed openings 42*a* through which the corresponding holders 11 can pass without contact, the sheet S does not move downstream of the front end position F in the sheet conveyance direction A, leading to prevention of sheet inflow to the downstream side in the conveyance direction of the sheet load position.

Disadvantages of the above-described configuration will be described.

According to the provided partition 42, even if the sheet S fails to be detached at the detachment position E, the sheet S hits against the partition 42 at the front end position F.

In this case, as illustrated in FIG. 13, the following holders 11 may hit against the sheet S.

Although the partition 42 is supported by the base 43, depending on the impact of hitting of the sheet S, the partition 42 is likely to deform or step-out is likely to occur due to a high load to the leading-end alignment motor 45.

Thus, in the present embodiment, in order to prevent each constituent in the leading-end alignment mechanism 40 including the partition 42 from being damaged or overloaded at the time of hitting, the load at which the leading-end alignment motor 45 is brought into step-out is designed smaller than the load at which the alignment guide plate 41, the partition 42, and the holders 11 each deform.

Such adjustment of the load at which the leading-end alignment motor 45 is brought into step-out as above causes the leading-end alignment motor 45 to be brought into step-out before any member of the alignment guide plate 41, the partition 42, and the holders 11 deforms due to hitting.

In a case where step-out occurs due to the impact of such hitting, the partition 42 moves downstream in the sheet conveyance direction A due to the step-out. Thus, the partition 42 retracts backward due to the step-out.

Furthermore, in a case where the torque detector 51 detects a torque abnormality in the leading-end alignment motor 45, the controller 50 causes the guide drive 53 to stop the driving of the guide mechanism 7.

The torque detector 51 monitors the motor torque of the leading-end alignment motor 45. For example, with a sheet S jammed in practice, when the leading-end alignment motor 45 performs an operation of leading-end alignment, the leading-end alignment motor 45 is overloaded due to the jam of the sheet S. Therefore, since the torque of the leading-end alignment motor 45 is monitored, if a sheet S causes a load abnormality, the controller 50 causes the guide drive 53 to stop the operation of the guide mechanism 7.

Simultaneously, the load abnormality detector 54 notifies the operation section 190 of the abnormality in the first sheet stacker 170.

According to such a configuration, even if a sheet S catches on any holder 11 to cause a jam, the controller 50 can detect the jam and stop the operation of the guide mechanism 7. Thus, the sheet S can be prevented from moving further downstream in the sheet conveyance direction A. Therefore, the operator can easily perform abnormality handling, such as removal of the sheet S.

Note that, instead of detection of a torque abnormality in the leading-end alignment motor 45, a torque abnormality in the shift motor 32 may be detected. In that case, similarly, the jam of a sheet S can be detected in an early stage.

Furthermore, in response to detection of a jam in the first sheet stacker 170, the load abnormality detector 54 notifies the operation section 190 of abnormality. In response to the notification, the operation section 190 can restrict the use of any conveyor located on the upstream side in the conveyance direction of the first sheet stacker 170. Examples of such control include stopping the operation of image formation of the image former 130. Therefore, the load abnormality detector 54 operates to detect abnormality in loading a sheet S in the first sheet stacker 170 or the second sheet stacker 180.

Alternatively, for example, with the second sheet stacker 180 disposed at the next stage in the conveyance direction of the first sheet stacker 170, when the load abnormality detector 54 detects abnormality in the first sheet stacker 170, a sheet S may be conveyed to the second sheet stacker 180 through the conveyance detour 9.

According to such a configuration, since a plurality of sheet stackers (first sheet stacker 170 and second sheet stacker 180) is provided as ejection destinations for sheets S, even in a case where an operation of loading a sheet S is difficult to perform in the first sheet stacker 170, the second sheet stacker 180 can carry on an operation of loading a sheet S. Thus, even if any trouble occurs, no loss is made in the operation time of the entire image forming apparatus 1.

In response to reception of notification of abnormality, the operation section 190 may cause a notifier to issue an audible alarm or turn on a light on a screen to notify the operator of the abnormality.

Such adjustment of the load at which the leading-end alignment motor 45 is brought into step-out as already described causes the leading-end alignment motor 45 to be brought into step-out before any member of the alignment guide plate 41, the partition 42, and the holders 11 deforms due to hitting.

As another embodiment of the present embodiment, for example, provided may be a method of detecting whether or not such step-out has occurred, instead of detecting a torque abnormality.

Figure 14:
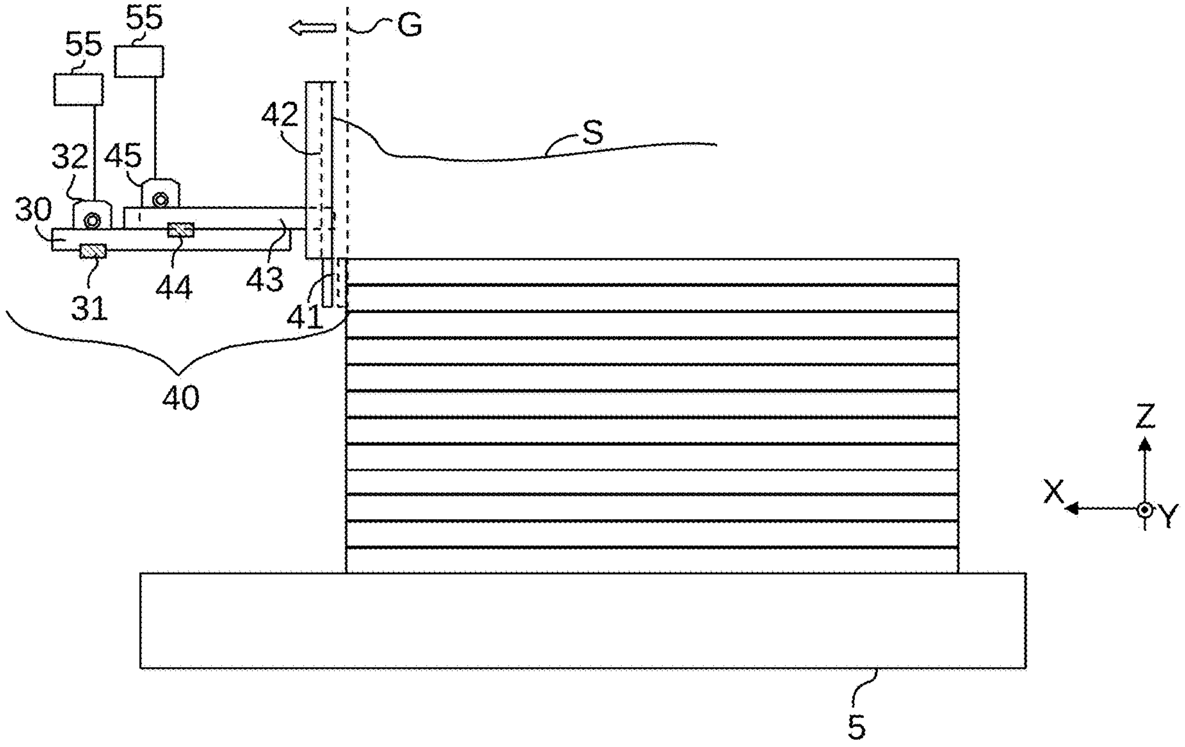
FIG. 14 illustrates an exemplary configuration in which a step-out detector is provided as another embodiment of the present embodiment.

FIG. 14 is a schematic view illustrating the occurrence of such step-out as above. Referring to FIG. 14, in a case where step-out occurs due to hitting of a sheet S against the partition 42, due to the step-out, the entirety of the partition 42 and the alignment guide plate 41 moves backward from a criterial position G to the downstream side in the A direction. That is, as indicated with solid lines in FIG. 14, the partition 42 moves backward due to the step-out, so that the partition 42 moves to a retraction position due to the impact of hitting against the sheet S.

In this case, as an exemplary method of detecting step-out of the leading-end alignment motor 45, conceivable is a method of detecting a deviation from an ideal control value while the angle of rotation of the leading-end alignment motor 45 serving as a stepping motor is being monitored by a well-known method with the encoder 55. In this case, the encoder 55 operates as a step-out detector for the leading-end alignment motor 45.

According to such a method, for example, a deviation of 1 mm from the ideal control value for the leading-end alignment motor 45 can be detected as step-out, so that a load abnormality regarding a sheet S can be detected promptly with high accuracy.

Note that such a step-out detector with the encoder 55 may be provided to the shift motor 32.

It is effective to provide such a step-out detector to one of the shift motor 32 and the leading-end alignment motor 45, in which the one is brought into step-out at a smaller load.

In response to detection of step-out of the leading-end alignment motor 45 or the shift motor 32 based on the step-out detector with the encoder 55, the controller 50 causes the load abnormality detector 54 to notify the operation section 190 of abnormality in the first sheet stacker 170.

Note that the other operations at the time of detection of abnormality are identical to the operations at the time of detection of abnormality with the torque detector 51, and thus repetitive description will be omitted.

In a case where such a step-out detector is provided, a load abnormality regarding a sheet S can be detected promptly with high accuracy. However, in practical operation, such high accuracy is not necessarily required in many cases.

For example, even in a case where a sheet S fails to be detached at the detachment position E and then hits against the partition 42 to be stacked on the sheet tray 5, for example, due to the operation of leading-end alignment of the leading-end alignment mechanism 40, aligned front ends are obtained for a sheet bundle acceptable without any problem.

According to a method of monitoring the leading-end alignment motor 45 or the shift motor 32 with a step-out detector such as an encoder, even in a case where step-out leading to no problem in practical operation occurs, the step-out is detected as a load abnormality.

Figure 15A:
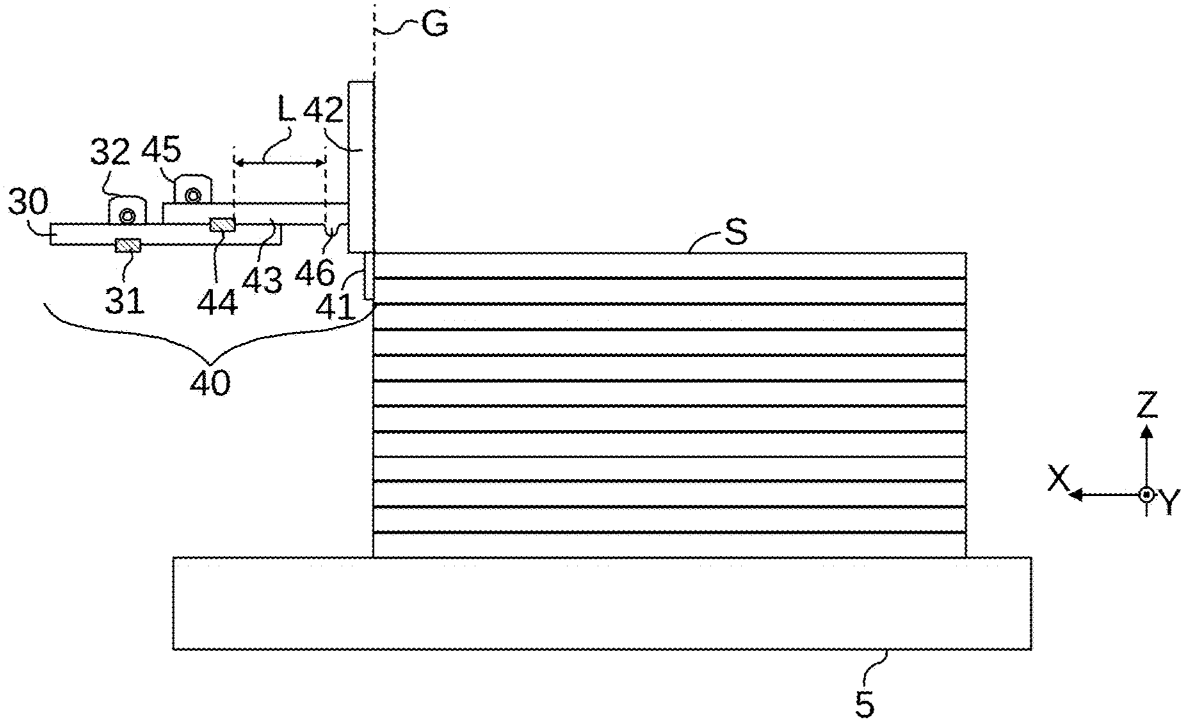
FIGS. 15A and 15B illustrate an exemplary configuration in which a step-out-based movement-distance detector is provided to a leading-end alignment mechanism as another embodiment of the present embodiment.

Thus, as illustrated in FIG. 15A, instead of a step-out detector such as an encoder, a movement-distance detection projection 46 may be provided to the base 43.

The function of the movement-distance detection projection 46 will be described.

The movement-distance detection projection 46 is provided to the lower portion of the base 43 on the downstream side in the sheet conveyance direction A of the partition 42 and protrudes downward from the base 43.

Figure 15B:
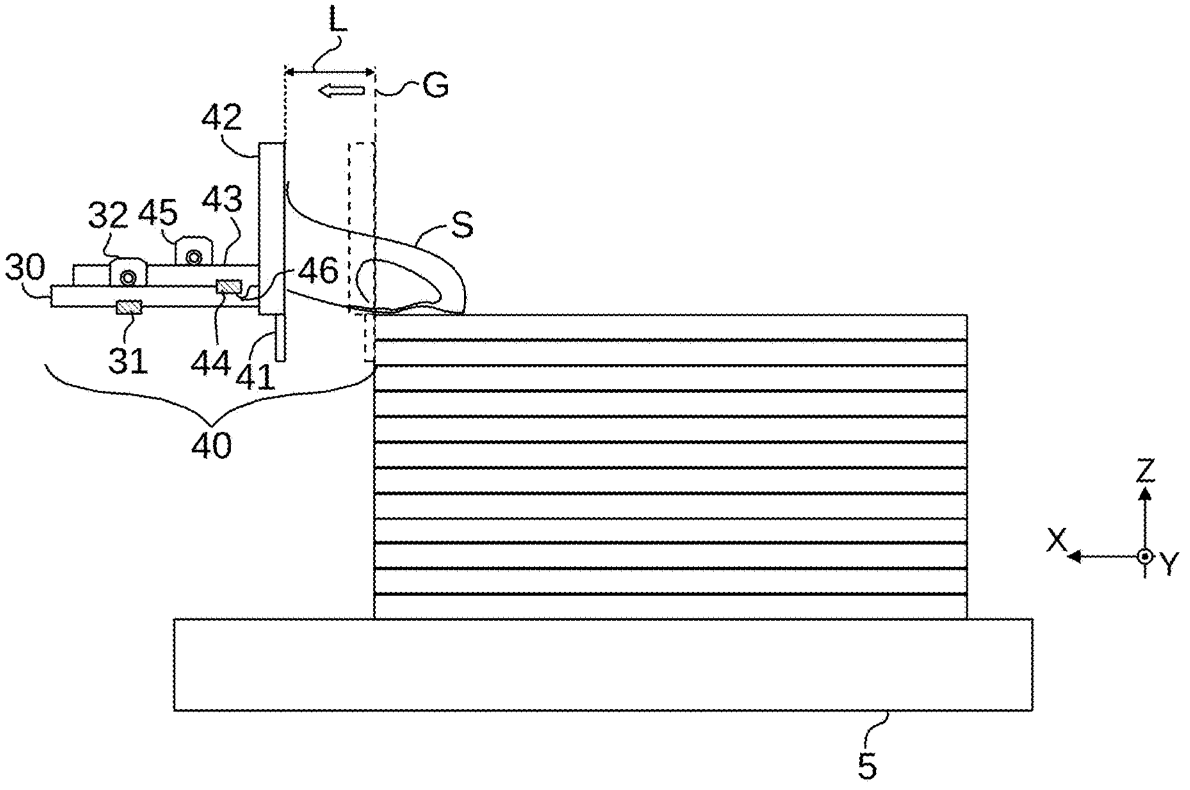

A larger impact of hitting of a sheet S causes a longer step-out distance. FIG. 15B illustrates a case where, after further backward movement of the movement-distance detection projection 46 from the criterial position G due to step-out, the movement-distance detection projection 46 is located at a position at which the leading-end alignment-mechanism position detecting sensor 44 can measure the movement-distance detection projection 46.

In this case, the leading-end alignment-mechanism position detecting sensor 44 can detect the movement-distance detection projection 46. Thus, in a case where the positional change due to hitting is not less than a predetermined distance, that is, in a case where the movement distance caused by step-out is not less than a certain distance L from the position of the leading-end alignment-mechanism position detecting sensor 44 to the movement-distance detection projection 46 at the criterial position G, the front end position can be detected as an abnormal position. Thus, use of the leading-end alignment-mechanism position detecting sensor 44 as a position detecting sensor requires no additional cost and enables detection of step-out causing a certain distance or more, based on detection of the movement-distance detection projection 46.

Alternatively, in particular, provided may be a well-known position detecting sensor that detects the movement-distance detection projection 46. As such a position detecting sensor, for example, preferably, an infrared sensor that emits infrared rays laterally is disposed such that the infrared rays can be blocked by the movement-distance detection projection 46.

Thus, the movement-distance detection projection 46 is provided to the base 43 without introducing an expensive mechanism, such as an encoder. In a case where the movement distance of the movement-distance detection projection 46 is a certain distance or more, an existing positional sensor can detect the case as abnormality.

According to such a configuration, a sheet load abnormality is detected when the degree of step-out is severe. Thus, step-out causing a predetermined distance or more can be detected as abnormality to the exclusion of any slight load abnormality leading to no problem in practical operation with no increase in cost. According to such a configuration, the movement-distance detection projection 46 operates as a movement-distance detector for detection of a backward movement by the certain distance L or more due to step-out.

Figure 16A:
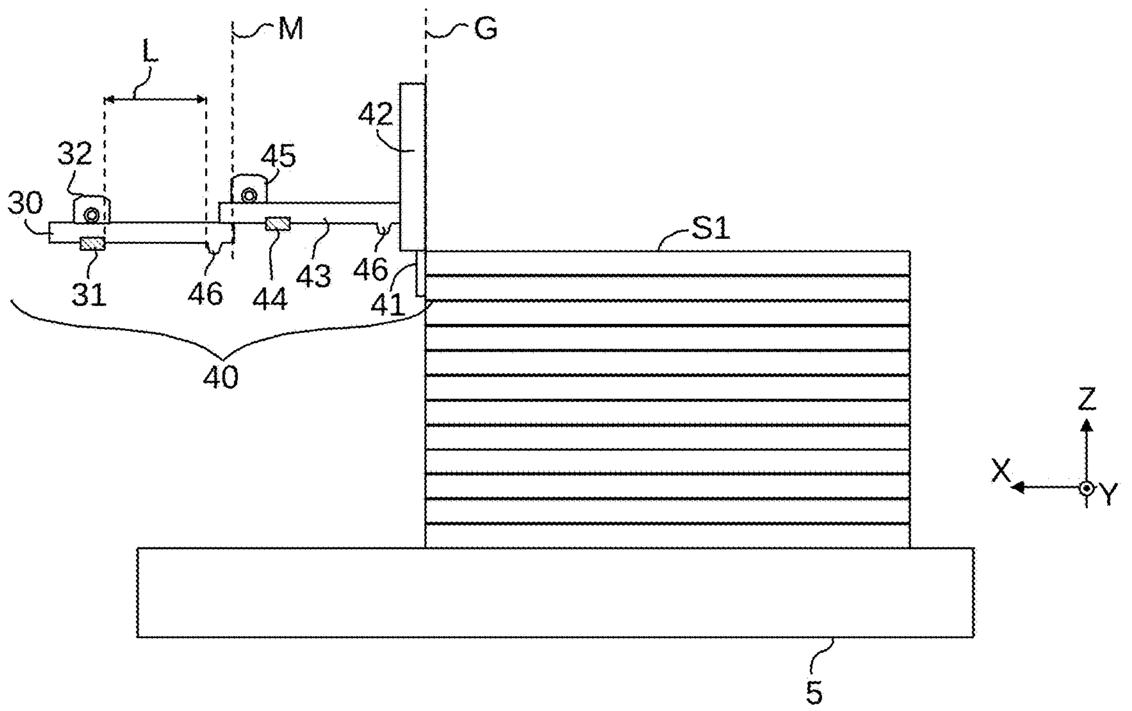
FIGS. 16A and 16B illustrate an exemplary configuration in which a step-out-based movement-distance detector is provided to a shift mechanism as another embodiment of the present embodiment.
Figure 16B:
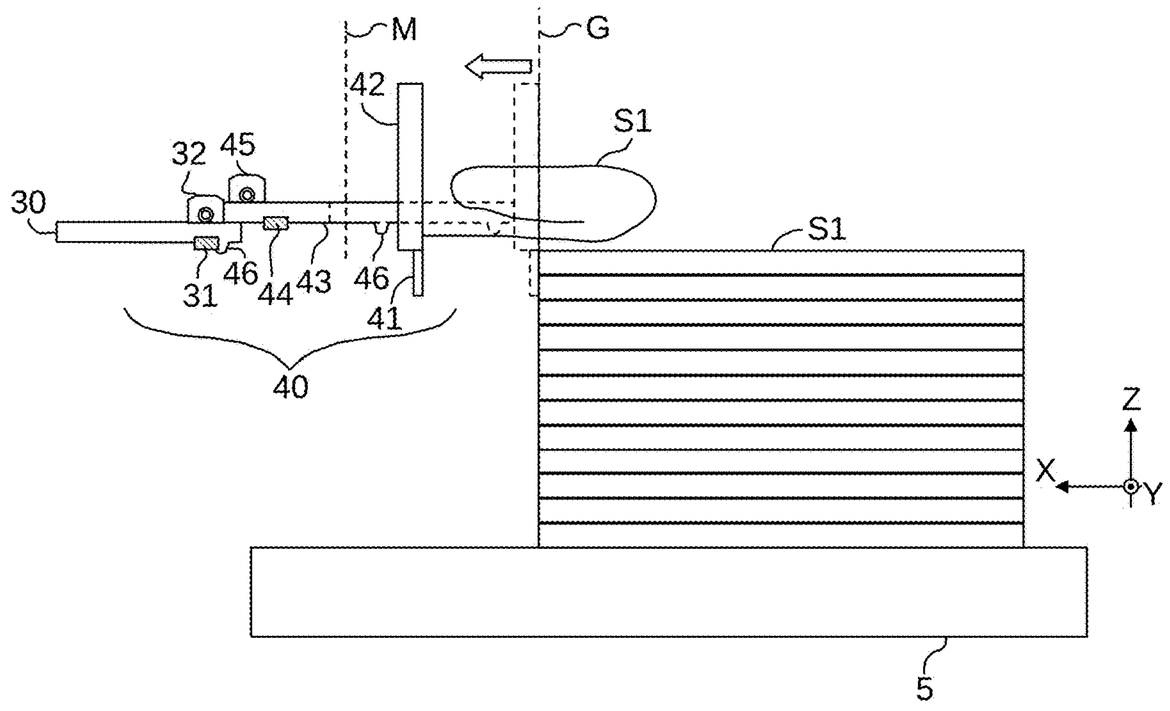

As illustrated in FIGS. 16A and 16B, such a movement-distance detection projection 46 may be provided to the shift mechanism 30. FIGS. 16A and 16B illustrate a case where small-sized sheets S1 different in length from sheets S are provided.

Furthermore, according to such a configuration, favorably, the load at which the shift motor 32 is brought into step-out is lower than the load at which the leading-end alignment motor 45 is brought into step-out such that, preferentially, the shift mechanism 30 moves backward due to step-out.

According to such a configuration, as illustrated in FIG. 16B, in a case where the shift mechanism 30 moves by the certain distance L or more due to step-out, the movement-distance detection projection 46 is detected by the shift-mechanism position detecting sensor 31 provided to the shift mechanism 30.

On the other hand, in such a mechanism, the movement distance detected with respect to the criterial position G may vary depending on the length of a sheet S, such as the length of a small-sized sheet S1.

However, for example, even in such a case as in FIG. 16B in which no detection is made until the step-out distance becomes maximum, a small-sized sheet S1 does not move behind the partition 42, leading to prevention of sheet inflow to the downstream side in the sheet conveyance direction A.

Even in such a case as illustrated in FIG. 16B, the partition 42 does not move backward from the sheet load limit position M illustrated in FIG. 11. Thus, even if a small-sized sheet S1 is loaded incorrectly, provided that the small-sized sheet S1 does not move behind the partition 42, the small-sized sheet S1 can be manually removed without any difficulty.

A sheet stacker includes a load table to stack a bundle of sheets; a conveyor to convey a sheet to the load table in a conveyance direction at a conveyance speed; a guide including a holder to: hold a leading end of the sheet conveyed by the conveyor by the holder at a standby position; and move the holder to guide the sheet along a movement path in the conveyance direction at a moving speed while holding the sheet by the holder; and a leading-end alignment mechanism including a partition extending to the movement path of the holder, the leading-end alignment mechanism to align, in the conveyance direction, a leading-end position of the sheet on the load table; and circuitry configured to differentiate the conveyance speed of the conveyor and the moving speed of the holder.

The leading-end alignment mechanism may include a leading-end alignment motor to: move the partition to a predetermined position; and keep the partition at the predetermined position, and the leading-end alignment motor steps out under a step-out load, the leading-end alignment mechanism has a first withstand load, the holder has a second withstand load, and the step-out load of the leading-end alignment motor is smaller than each of the first withstand load of the leading-end alignment mechanism and the second withstand load of the holder.

The sheet stacker may further include a torque abnormality detector to detect a torque abnormality in the leading-end alignment motor, and the circuitry causes the guide to stop moving the holder in response to a detection of the torque abnormality in the leading-end alignment motor by the torque abnormality detector.

The sheet stacker may further include a position detecting sensor to detect a position of the leading-end alignment mechanism, and the circuitry causes the guide to stop moving the holder when the leading-end alignment mechanism moves a certain distance or more from the predetermined position.

The sheet stacker may further include a step-out detector to detect a step-out of the leading-end alignment motor, and the circuitry causes the guide to stop moving the holder in response to a detection of the step-out of the leading-end alignment motor by the step-out detector.

The sheet stacker may further include: a shift mechanism to move the leading-end alignment mechanism in the conveyance direction; and a shift motor to move the shift mechanism, wherein the shift motor steps out under a step-out load, the leading-end alignment mechanism has a first withstand load, the guide has a second withstand load, and the step-out load of the shift motor is smaller than each of the first withstand load of the leading-end alignment mechanism and the second withstand load of the guide.

The sheet stacker may further include a torque abnormality detector to detect a torque abnormality in the shift motor, and the circuitry causes the guide to stop moving the holder in response to a detection of the torque abnormality in the shift motor by the torque abnormality detector.

The sheet stacker may further include a position-detecting sensor to detect a position of the shift mechanism, and the circuitry causes the guide to stop moving the holder when the shift mechanism moves a certain distance or more from a predetermined position.

The sheet stacker may further include a step-out detector to detect a step-out of the shift motor, and the circuitry causes the guide to stop moving the holder in response to a detection of the step-out of the shift motor by the step-out detector.

An image forming apparatus may include: the sheet stacker; and a load abnormality detector to detect a stop of the holder as an occurrence of abnormality.

The image forming apparatus may further include: a conveyor disposed upstream of the sheet stacker in the conveyance direction, the conveyor to convey the sheet to the sheet stacker, wherein the circuitry stops the conveyor in response to a detection of the abnormality by the load abnormality detector.

The image forming apparatus may further include a plurality of sheet ejection destinations different from the sheet stacker, and the circuitry causes the conveyor to convey the sheet to any of the plurality of sheet ejection destinations in response to a detection of the abnormality by the load abnormality detector.

The image forming apparatus may further include an operation section, and the circuitry displays the abnormality on the operation section in response to a detection of the abnormality by the load abnormality detector.

The image forming apparatus includes the sheet stacker. The sheet stacker may further includes: a shift mechanism to move the leading-end alignment mechanism in the conveyance direction; and a shift motor to move the shift mechanism, wherein the shift motor steps out under another step-out load, and said another step-out load of the shift motor is smaller than the step-out load of the leading-end alignment motor.

In the above embodiments, an exemplary inkjet recorder that forms a full-color image has been given as the image forming apparatus 1 to which the present embodiment can be applied. Any image forming apparatus to which the present embodiment can be applied is not limited to the example, and thus the present embodiment can be applied to, for example, a copier, a facsimile, or a multifunction peripheral.

In the above embodiments, given has been a configuration in which a sheet S is used as a recording medium for image formation. Such a sheet S is not limited to recording paper. Examples of the sheet S include cardboard, postcards, rolled paper, envelopes, plain paper, thin paper, coated paper (e.g., coated paper and art paper), tracing paper, overhead projector (OHP) sheets, OHP films, and resin films. That is, any sheet may be used, provided that its material is hygroscopic and an image can be formed thereon.

The functionality of the elements disclosed herein such as the controller 50 may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

Aspects of the present embodiment are, for example, as follows.

Aspect 1

According to Aspect 1, a first sheet stacker 170 includes: a sheet tray 5 to be stacked with a sheet bundle; a conveyor 6 to convey a sheet S in a conveyance direction A to the sheet tray 5; a holder 11 to hold, at a standby position, a leading end of the sheet S conveyed by the conveyor 6 and then move in the conveyance direction A of the sheet S to guide conveyance of the sheet S; and a leading-end alignment mechanism 40 to align, in the conveyance direction A, a leading end position of the sheet S on the sheet tray 5, the leading-end alignment mechanism 40 including a partition 42 extending onto a movement path of the holder 11, in which, with a difference of speed between a sheet conveyance speed of the conveyor 6 and a moving speed of the holder 11, the sheet S, the leading end of which is held by the holder 11, is detached from the holder 11 at a detachment position such that the sheet S detached falls so as to be loaded on the sheet tray 5.

According to Aspect 1, prevented can be sheet inflow to the downstream side in the conveyance direction A of a sheet load position.

Aspect 2

According to Aspect 2, in the first sheet stacker 170 of Aspect 1, the leading-end alignment mechanism 40 includes a leading-end alignment motor 45, and a load at which the leading-end alignment motor 45 is brought into step-out is designed smaller than a load at which the leading-end alignment mechanism 40 and the holder 11 each deform.

According to Aspect 2, in response to a jam of the sheet S, the leading-end alignment motor 45 is brought into step-out and the partition 42 moves backward. Thus, prevented can be sheet inflow to the downstream side in the conveyance direction A of the partition 42 with the holder 11 and the partition 42 prevented from deforming.

Aspect 3

According to Aspect 3, the first sheet stacker 170 of Aspect 2 further includes a controller 50 including a torque detector 51 as a torque abnormality detector, in which, in response to detection of a torque abnormality in the leading-end alignment motor 45 with the leading-end alignment mechanism 40 in operation, the controller 50 causes the holder 11 to stop driving.

According to Aspect 3, in response to detection of a torque abnormality in the leading-end alignment motor 45, the holder 11 stops driving, promptly. Thus, prevented can be sheet inflow to the downstream side in the conveyance direction A of the partition 42.

Aspect 4

According to Aspect 4, the first sheet stacker 170 of Aspect 2 further includes a leading-end alignment-mechanism position detecting sensor 44 to detect a position of the leading-end alignment mechanism 40, in which, in a case where the position of the leading-end alignment mechanism 40 is detected as being at a certain distance L or more from a criterial position G due to step-out, the holder 11 is caused to stop driving.

According to Aspect 4, sheet inflow to the downstream side in the conveyance direction A of the partition 42 can be prevented and additionally the leading-end alignment-mechanism position detecting sensor 44 to detect the position of the leading-end alignment mechanism 40 can detect a positional change at the time of hitting. Thus, the holder 11 stops driving promptly at the time of abnormality, leading to prevention of sheet inflow to the downstream side in the conveyance direction A of the sheet load position.

Aspect 5

According to Aspect 5, the first sheet stacker 170 of Aspect 2 further includes an encoder 55 as a step-out detector for the leading-end alignment motor 45, in which, in response to detection of backward movement of the partition 42 by the step-out detector, the holder 11 is caused to stop driving.

According to Aspect 5, sheet inflow to the downstream side in the conveyance direction A of the partition 42 can be prevented and additionally the encoder 55 can detect a positional change of the partition 42 at the time of hitting of the sheet S. Thus, the holder 11 stops driving promptly at the time of abnormality, leading to prevention of sheet inflow to the downstream side in the conveyance direction A of the sheet load position.

Aspect 6

According to Aspect 6, the first sheet stacker 170 of Aspect 1 further includes: a shift mechanism 30 to move the leading-end alignment mechanism 40 in the conveyance direction A; and a shift motor 32 to move the shift mechanism 30, in which a load at which the shift motor 32 is brought into step-out is designed smaller than a load at which the leading-end alignment mechanism 40 and the holder 11 each deform.

According to Aspect 6, in response to a jam of the sheet S, the shift motor 32 is brought into step-out and the partition 42 moves backward. Thus, prevented can be sheet inflow to the downstream side in the conveyance direction A of the partition 42 with the holder 11 and the partition 42 prevented from deforming.

Aspect 7

According to Aspect 7, the first sheet stacker 170 of Aspect 6 further includes a controller 50 including a torque detector 51 having a torque abnormality detector, in which, in response to detection of a torque abnormality in the shift motor 32, the controller 50 causes the holder 11 to stop driving.

According to Aspect 7, in response to a torque abnormality, the holder 11 stops driving, promptly. Thus, prevented can be sheet inflow to the downstream side in the conveyance direction A of the sheet load position.

Aspect 8

According to Aspect 8, the first sheet stacker 170 of Aspect 6 further includes a shift-mechanism position detecting sensor 31, in which, in a case where a position of the shift mechanism 30 is detected as being at a certain distance L or more from a criterial position G due to step-out, the holder 11 is caused to stop driving.

According to Aspect 8, sheet inflow to the downstream side in the conveyance direction A of the partition 42 can be prevented and additionally the shift-mechanism position detecting sensor 31 to detect the position of the shift mechanism 30 can detect a positional change at the time of hitting. Thus, the holder 11 stops driving promptly at the time of abnormality, leading to prevention of sheet inflow to the downstream side in the conveyance direction A of the sheet load position.

Aspect 9

According to Aspect 9, the first sheet stacker 170 of Aspect 6 further includes an encoder 55 as a step-out detector for the shift motor 32, in which, in response to detection of backward movement of the shift mechanism 30 by the step-out detector, the holder 11 is caused to stop driving.

According to Aspect 9, sheet inflow to the downstream side in the conveyance direction A of the partition 42 can be prevented and additionally the encoder 55 can detect a positional change of the partition 42 at the time of hitting of the sheet S. Thus, the holder 11 stops driving promptly at the time of abnormality, leading to prevention of sheet inflow to the downstream side in the conveyance direction A of the sheet load position.

Aspect 10

According to Aspect 10, an image forming apparatus 1 includes: the first sheet stacker 170 of Aspect 1; and a load abnormality detector 54 to detect a stop of the holder 11 as abnormality.

According to Aspect 10, the load abnormality detector 54 can notify an operation section 190 of a load abnormality. Thus, the holder 11 stops driving, promptly, leading to prevention of sheet inflow to the downstream side in the conveyance direction A of the sheet load position.

Aspect 11

According to Aspect 11, the image forming apparatus 1 of Aspect 10 further includes a plurality of conveyors to convey the sheet S to the first sheet stacker 170, the plurality of conveyors including: a sheet feeder 110; a sheet position adjuster 120; an image former 130; a sheet dryer 140; a sheet cooler 150; and a sheet reverser 160, the plurality of conveyors being located on an upstream side in the conveyance direction A of the first sheet stacker 170, in which, in response to detection of the abnormality by the load abnormality detector 54, any of the plurality of conveyors stops conveying.

According to Aspect 11, in response to detection of a load abnormality by the load abnormality detector 54, the image forming apparatus 1 can stop the operation of conveyance, promptly.

Aspect 12

According to Aspect 12, the image forming apparatus 1 of Aspect 10 further includes a second sheet stacker 180 different from the first sheet stacker 170, in which, in response to detection of the abnormality by the load abnormality detector 54, the sheet S is conveyed to the second sheet stacker 180.

According to Aspect 12, since a plurality of sheet stackers (first sheet stacker 170 and second sheet stacker 180) is provided as ejection destinations for the sheet S, even in a case where an operation of loading the sheet S is difficult to perform in the first sheet stacker 170, the second sheet stacker 180 can carry on the operation of loading. Thus, even if any trouble occurs, no loss is made in the operation time of the entire image forming apparatus 1.

Aspect 13

According to Aspect 13, the image forming apparatus 1 of Aspect 10 further includes a notifier to notify an operator of the abnormality, in which, in response to detection of the abnormality by the load abnormality detector 54, the notifier notifies the operator of the abnormality.

According to Aspect 13, the operator can be notified of the abnormality, promptly.

Aspect 14

An image forming apparatus 1 includes the first sheet stacker 170 of Aspect 1.

According to Aspect 14, in the image forming apparatus 1, the first sheet stacker 170 can load the sheet S therein.

According to the present embodiment, prevented can be sheet inflow to the downstream side in the conveyance direction of a sheet load position.

Preferred embodiments of the present embodiment have been described above, but the present embodiment is not limited to such particular embodiments. Unless otherwise particularly limited in the above description, various modifications and alterations may be made without departing from the scope of the gist of the present embodiment in the claims.

The effects described in the embodiments of the present embodiment are merely examples of the most preferable effects generated from the present embodiment. Thus, the effects of the present embodiment are not limited to the effects described in the embodiments of the present embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A sheet stacker comprising:

a load table to stack a bundle of sheets;

a conveyor to convey a sheet to the load table in a conveyance direction at a conveyance speed;

a guide including a holder to:

hold a leading end of the sheet conveyed by the conveyor by the holder at a standby position; and move the holder to guide the sheet along a movement path in the conveyance direction at a moving speed while holding the sheet by the holder; and a leading-end aligner including a partition extending to the movement path of the holder, the leading-end aligner to align, in the conveyance direction, a leading-end position of the sheet on the load table; and circuitry configured to differentiate the conveyance speed of the conveyor and the moving speed of the holder to detach and load the sheet, held by the holder, on the load table at a detachment position, wherein:

the leading-end aligner includes a leading-end alignment motor to:

move the partition to a predetermined position; and keep the partition at the predetermined position, and the leading-end alignment motor steps out under a step-out load, the leading-end aligner has a first withstand load, the holder has a second withstand load, and the step-out load of the leading-end alignment motor is smaller than each of the first withstand load of the leading-end aligner and the second withstand load of the holder.

2. The sheet stacker according to claim 1, further comprising:

a torque abnormality detector to detect a torque abnormality in the leading-end alignment motor, wherein the circuitry causes the guide to stop moving the holder in response to a detection of the torque abnormality in the leading-end alignment motor by the torque abnormality detector.

3. The sheet stacker according to claim 1, further comprising:

a position detecting sensor to detect a position of the leading-end aligner, wherein the circuitry causes the guide to stop moving the holder when the leading-end aligner moves a certain distance or more from the predetermined position.

4. The sheet stacker according to claim 1, further comprising:

a step-out detector to detect a step-out of the leading-end alignment motor, wherein the circuitry causes the guide to stop moving the holder in response to a detection of the step-out of the leading-end alignment motor by the step-out detector.

5. A sheet stacker, comprising:

a load table to stack a bundle of sheets;

a conveyor to convey a sheet to the load table in a conveyance direction at a conveyance speed;

a guide including a holder to:

hold a leading end of the sheet conveyed by the conveyor by the holder at a standby position; and move the holder to guide the sheet along a movement path in the conveyance direction at a moving speed while holding the sheet by the holder;

a leading-end aligner including a partition extending to the movement path of the holder, the leading-end aligner to align, in the conveyance direction, a leading-end position of the sheet on the load table; and a shifter to move the leading-end aligner in the conveyance direction; and a shift motor to move the shifter;

circuitry configured to differentiate the conveyance speed of the conveyor and the moving speed of the holder to detach and load the sheet, held by the holder, on the load table at a detachment position, wherein:

the shift motor steps out under a step-out load, the leading-end aligner has a first withstand load, the guide has a second withstand load, and the step-out load of the shift motor is smaller than each of the first withstand load of the leading-end aligner and the second withstand load of the guide.

6. The sheet stacker according to claim 5, further comprising;

a torque abnormality detector to detect a torque abnormality in the shift motor, wherein the circuitry causes the guide to stop moving the holder in response to a detection of the torque abnormality in the shift motor by the torque abnormality detector.

7. The sheet stacker according to claim 5, further comprising:

a position-detecting sensor to detect a position of the shifter, wherein the circuitry causes the guide to stop moving the holder when the shifter moves a certain distance or more from a predetermined position.

8. The sheet stacker according to claim 5, further comprising:

a step-out detector to detect a step-out of the shift motor, wherein the circuitry causes the guide to stop moving the holder in response to a detection of the step-out of the shift motor by the step-out detector.

9. An image forming apparatus comprising:

the sheet stacker according to claim 1; and a load abnormality detector to detect a stop of the holder as an occurrence of abnormality.

10. The image forming apparatus according to claim 9, further comprising:

another conveyor, the another conveyor being disposed upstream of the sheet stacker in the conveyance direction, the another conveyor to convey the sheet to the sheet stacker, wherein the circuitry stops the another conveyor in response to a detection of the abnormality by the load abnormality detector.

11. An image forming apparatus, comprising:

a sheet stacker;

a guide including a holder a load abnormality detector to detect a stop of the holder as an occurrence of an abnormality, the sheet stacker including:

a load table to stack a bundle of sheets;

a conveyor to convey a sheet to the load table in a convevance direction at a conveyance speed:

the holder to:

hold a leading end of the sheet conveyed by the conveyor by the holder at a standby position; and move the holder to guide the sheet along a movement path in the conveyance direction at a moving speed while holding the sheet by the holder;

a leading-end aligner including a partition extending to the movement path of the holder, the leading-end aligner to align, in the conveyance direction, a leading-end position of the sheet on the load table:

circuitry configured to differentiate the conveyance speed of the conveyor and the moving speed of the holder to detach and load the sheet, held by the holder, on the load table at a detachment position; and a plurality of sheet ejection destinations different from the sheet stacker, wherein the circuitry causes the conveyor to convey the sheet to any of the plurality of sheet ejection destinations in response to a detection of the abnormality by the load abnormality detector.

12. The image forming apparatus according to claim 9, further comprising an operation section, wherein the circuitry displays the abnormality on the operation section in response to a detection of the abnormality by the load abnormality detector.

13. An image forming apparatus comprising the sheet stacker according to claim 1.

14. The sheet stacker according to claim 1, further comprising:

a shifter to move the leading-end aligner in the conveyance direction; and a shift motor to move the shifter, wherein the shift motor steps out under another step-out load, and said another step-out load of the shift motor is smaller than the step-out load of the leading-end alignment motor.

15. The sheet stacker according to claim 1, wherein the partition has a recessed opening through which the guide passes.

16. The sheet stacker according to claim 1, wherein:

the guide further includes an endless conveyance belt stretched around a drive roller and a driven roller, and the holder is attached to the endless conveyance belt.

17. The sheet stacker according to claim 1, further comprising:

a blower fan disposed downstream of the conveyor in the conveyance direction, the blower fan to push the sheet toward the load table.

18. The sheet stacker according to claim 1, further comprising:

a sheet leading-end detecting sensor disposed upstream of the conveyor in the conveyance direction, the sheet leading-end detecting sensor to detect the leading end of the sheet.

19. The sheet stacker according to claim 1, further comprising:

a side aligner including a side alignment plate to abut on a side of the sheet placed on the load table to align a position of the sheet in a width direction orthogonal to the conveyance direction.

20. The sheet stacker according to claim 1, further comprising:

a feed roller disposed upstream of the conveyor to eject the sheet to the conveyor.

* * * * *